(12) United States Patent
Wang et al.

(10) Patent No.: US 11,413,528 B2
(45) Date of Patent: Aug. 16, 2022

(54) METHOD, APPARATUS, AND DEVICE FOR DISPLAYING SKIN OF VIRTUAL CHARACTER

(71) Applicant: TENCENT TECHNOLOGY (SHENZHEN) COMPANY LIMITED, Shenzhen (CN)

(72) Inventors: Tianyu Wang, Shenzhen (CN); Zidong Mo, Shenzhen (CN); Haichao Zhang, Shenzhen (CN); Yongliang Huang, Shenzhen (CN); Chuan Lv, Shenzhen (CN); Xiangya Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/203,720

(22) Filed: Mar. 16, 2021

(65) Prior Publication Data
US 2021/0197089 A1 Jul. 1, 2021

Related U.S. Application Data

(63) Continuation of application No. PCT/CN2019/120941, filed on Nov. 26, 2019.

(30) Foreign Application Priority Data

Dec. 13, 2018 (CN) .......................... 201811525612.7

(51) Int. Cl.
*A63F 13/52* (2014.01)
(52) U.S. Cl.
CPC ..................................... *A63F 13/52* (2014.09)
(58) Field of Classification Search
CPC .......... A63F 13/35; A63F 13/52; A63F 13/60; A63F 13/79; A63F 13/822
See application file for complete search history.

(56) References Cited

U.S. PATENT DOCUMENTS

| 7,761,339 B2 * | 7/2010 | Alivandi | ................ G06Q 30/02 705/26.5 |
| 2005/0182693 A1 * | 8/2005 | Alivandi | ................ A63F 13/12 705/26.5 |

(Continued)

FOREIGN PATENT DOCUMENTS

| CN | 101071457 A | 11/2007 |
| CN | 103390286 A | 11/2013 |

(Continued)

OTHER PUBLICATIONS

The World Intellectual Property Organization (WIPO) International Search Report for PCT/CN2019/120941 dated Feb. 24, 2020 5 Pages (including translation).

(Continued)

*Primary Examiner* — Chase E Leichliter
(74) *Attorney, Agent, or Firm* — Anova Law Group, PLLC

(57) ABSTRACT

A method for displaying a skin of a virtual character includes: displaying a matchmaking user interface (UI) for matching k user accounts online for gaming in the same virtual world, k being a positive integer; obtaining a customization parameter of a customized skin model of a target virtual character from a server when the target virtual character is present in virtual characters used by the k user accounts; loading n target skin component materials of the customized skin model according to the customization parameter, n being a positive integer; and displaying a gaming UI. The customized skin model is one of complete skin set models corresponding to the target virtual character and includes n skin components in a same style. The gaming UI includes the target virtual character located in the virtual world, the target virtual character wearing the customized skin model.

20 Claims, 12 Drawing Sheets

(56) References Cited

U.S. PATENT DOCUMENTS

| | | | |
|---|---|---|---|
| 2009/0254859 A1* | 10/2009 | Arrasvuori | G06Q 10/10 |
| | | | 715/810 |
| 2009/0299960 A1* | 12/2009 | Lineberger | A63F 13/12 |
| 2010/0020082 A1 | 1/2010 | Kumakura et al. | |
| 2012/0071244 A1* | 3/2012 | Gillo | A63F 13/00 |
| | | | 463/42 |
| 2012/0142429 A1* | 6/2012 | Muller | A63F 13/35 |
| | | | 463/42 |
| 2015/0038233 A1* | 2/2015 | Rom | A63F 13/795 |
| | | | 463/42 |
| 2015/0057084 A1* | 2/2015 | Lin | A63F 13/352 |
| | | | 463/42 |
| 2016/0001181 A1* | 1/2016 | Marr | G07F 17/3272 |
| | | | 463/42 |
| 2016/0082348 A1* | 3/2016 | Kehoe | G06Q 50/01 |
| | | | 463/31 |
| 2016/0166935 A1* | 6/2016 | Condrey | A63F 13/48 |
| | | | 463/31 |
| 2017/0080346 A1* | 3/2017 | Abbas | A63F 13/79 |
| 2017/0212771 A1* | 7/2017 | Weissberg | G06F 3/04845 |
| 2019/0091575 A1* | 3/2019 | Reiche, III | A63F 13/79 |
| 2019/0091577 A1* | 3/2019 | Reiche, III | A63F 13/798 |
| 2019/0091581 A1* | 3/2019 | Reiche, III | A63F 13/795 |
| 2019/0091582 A1* | 3/2019 | Reiche, III | A63F 13/847 |
| 2019/0192971 A1* | 6/2019 | Eatedali | A63F 13/58 |
| 2019/0362531 A1* | 11/2019 | Smith | G16B 20/20 |
| 2021/0082018 A1* | 3/2021 | Bull | G06Q 30/0643 |

FOREIGN PATENT DOCUMENTS

| | | |
|---|---|---|
| CN | 103414630 A | 11/2013 |
| CN | 106075909 A | 11/2016 |
| CN | 106204698 A | 12/2016 |
| CN | 106730836 A | 5/2017 |
| CN | 108295468 A | 7/2018 |
| CN | 109603151 A | 4/2019 |
| JP | 2009104522 A | 5/2009 |
| JP | 2009199438 A | 9/2009 |
| JP | 201033298 A | 2/2010 |
| JP | 201187625 A | 5/2011 |
| JP | 2013162836 A | 8/2013 |
| JP | 2013210881 A | 10/2013 |
| JP | 3264659 B2 | 1/2018 |

OTHER PUBLICATIONS

The State Intellectual Property Office of the People's Republic of China (SIPO) Office Action 1 for for 201811525612.7 dated Feb. 26, 2021 13 Pages (including translation).

Siwan Fan, "What does the King Glory Star Project mean? Star Project Content Collection 2018," www.9ht.com, Aug. 20, 2018, Retrieved from the InternetURL: https://m.9ht.com/W/54441. 38 pages.

The Japan Patent Office (JPO) Notification of Reasons for Refusal for Application No. 2021-506321 dated Apr. 5, 2022 11 Pages (including translation).

* cited by examiner

METHOD, APPARATUS, AND DEVICE FOR DISPLAYING SKIN OF VIRTUAL CHARACTER

CROSS-REFERENCES TO RELATED APPLICATIONS

This application is a continuation application of PCT Patent Application No. PCT/CN2019/120941, filed on Nov. 26, 2019, which claims priority to Chinese Patent Application No. 201811525612.7, filed with the Chinese Patent Office on Dec. 13, 2018 and entitled "METHOD, APPARATUS, AND DEVICE FOR DISPLAYING SKIN OF VIRTUAL CHARACTER", both of which are incorporated herein by reference in their entirety.

FIELD OF THE TECHNOLOGY

The present disclosure relates to the field of three-dimensional image processing, and in particular, to a method, an apparatus, and a device for displaying a skin of a virtual character.

BACKGROUND OF THE DISCLOSURE

At present, many clients provide a virtual world. There are one or more controllable virtual characters in the virtual world. The virtual character may be a person, an animal, a cartoon character or the like.

For example, a client provides a multiplayer online battle arena (MOBA) game. The client provides the same virtual character with different appearances, which are referred to as skins for short. Each skin is implemented by a complete skin set model. The same skin model is formed by hair, a face, an outfit, an armor, a weapon, a mount, and the like that have a uniform design style. For example, a skin of Guan Yu includes a green hat, a green outfit, a red face, the Green Dragon Crescent Blade, and the Red Hare. The virtual character may wear different skin models and is controlled by a user to perform gaming actions such as moving, attacking, and skill casting during an in-game battle.

The skin model is directly related to the presentation of the virtual character in a three-dimensional virtual world. However, a design process of a style, a texture, a map, and the like of one skin model is relatively complex. A design cycle of each skin model of the virtual character may take several months. As a result, the skin model has a relatively large data amount. Limited by the design cycle and the data amount, in the related art, the same virtual character is provided with only a limited quantity of skin models for change, and it is difficult to meet personalized display requirements.

SUMMARY

A method for displaying a skin of a virtual character is performed by a terminal, and includes: displaying a matchmaking user interface (UI) for matching k user accounts online for gaming in the same virtual world, k being a positive integer; obtaining a customization parameter of a customized skin model of a target virtual character from a server when the target virtual character is present in virtual characters used by the k user accounts; loading n target skin component materials of the customized skin model according to the customization parameter, n being a positive integer; and displaying a gaming UI. The customized skin model is one of complete skin set models corresponding to the target virtual character and includes n skin components in a same style. The gaming UI includes the target virtual character located in the virtual world, the target virtual character wearing the customized skin model.

A method for displaying a skin of a virtual character is performed by a server, and includes: receiving a matchmaking request of a client; matching k user accounts for competition in the same virtual world according to the matchmaking request, k being a positive integer; determining virtual characters to be used by the k user accounts; and transmitting a customization parameter of a customized skin model to k clients that respectively correspond to the k virtual characters when a target virtual character having the customized skin model is present in the k virtual characters, the customized skin model being one of complete skin set models corresponding to the target virtual character, the customized skin model including n skin components in the same style, at least one skin component in the n skin components corresponding to a plurality of candidate skin component materials, the customization parameter being used for indicating n target skin component materials of the customized skin model, n being a positive integer.

A terminal includes a memory and one or more processors, the memory storing computer-readable instructions, the computer-readable instructions, when executed by the one or more processors, causing the one or more processors to perform a plurality of operations. The operations includes: displaying a matchmaking user interface (UI) for matching k user accounts online for gaming in the same virtual world, k being a positive integer; obtaining a customization parameter of a customized skin model of a target virtual character from a server when the target virtual character is present in virtual characters used by the k user accounts; loading n target skin component materials of the customized skin model according to the customization parameter, n being a positive integer; and displaying a gaming UI. The customized skin model is one of complete skin set models corresponding to the target virtual character and includes n skin components in a same style. The gaming UI includes the target virtual character located in the virtual world, the target virtual character wearing the customized skin model.

A server includes a memory and one or more processors, the memory storing computer-readable instructions, the computer-readable instructions, when executed by the one or more processors, causing the one or more processors to perform the following operations: receiving a matchmaking request of a client; matching k user accounts for competition in the same virtual world according to the matchmaking request, k being a positive integer; determining k virtual characters to be used by the k user accounts; and transmitting a customization parameter of a customized skin model to k clients that respectively correspond to the k virtual characters when a target virtual character having the customized skin model is present in the k virtual characters, the customized skin model being one of complete skin set models corresponding to the target virtual character, the customized skin model including n skin components in the same style, at least one skin component in the n skin components corresponding to a plurality of candidate skin component materials, the customization parameter being used for indicating n target skin component materials of the customized skin model, n being a positive integer.

One or more non-transitory computer-readable storage media storing computer-readable instructions are provided, the computer-readable instructions, when executed by one or more processors of a terminal, causing the one or more processors to perform a plurality of operations. The operations include: displaying a matchmaking user interface (UI) for matching k user accounts online for gaming in the same virtual world, k being a positive integer; obtaining a customization parameter of a customized skin model of a target virtual character from a server when the target virtual character is present in virtual characters used by the k user accounts; loading n target skin component materials of the customized skin model according to the customization parameter, n being a positive integer; and displaying a gaming UI. The customized skin model is one of complete skin set models corresponding to the target virtual character and includes n skin components in a same style. The gaming UI includes the target virtual character located in the virtual world, the target virtual character wearing the customized skin model.

One or more non-transitory computer-readable storage media storing computer-readable instructions are provided, the computer-readable instructions, when executed by one or more processors of a server, causing the one or more processors to perform a plurality of operations. The operations include: receiving a matchmaking request of a client; matching k user accounts for competition in the same virtual world according to the matchmaking request, k being a positive integer; determining k virtual characters to be used by the k user accounts; and transmitting a customization parameter of a customized skin model to k clients that respectively correspond to the k virtual characters when a target virtual character having the customized skin model is present in the k virtual characters, the customized skin model being one of complete skin set models corresponding to the target virtual character, the customized skin model including n skin components in the same style, at least one skin component in the n skin components corresponding to a plurality of candidate skin component materials, the customization parameter being used for indicating n target skin component materials of the customized skin model, n being a positive integer.

Other aspects of the present disclosure can be understood by those skilled in the art in light of the description, the claims, and the drawings of the present disclosure.

BRIEF DESCRIPTION OF THE DRAWINGS

To describe the technical solutions in embodiments of the present disclosure more clearly, accompanying drawings required for describing the embodiments are briefly described hereinafter. Apparently, the accompanying drawings in the following description show merely some embodiments of the present disclosure, and a person of ordinary skill in the art may obtain other accompanying drawings according to the accompanying drawings without creative efforts.

DESCRIPTION OF EMBODIMENTS

Figure 1:
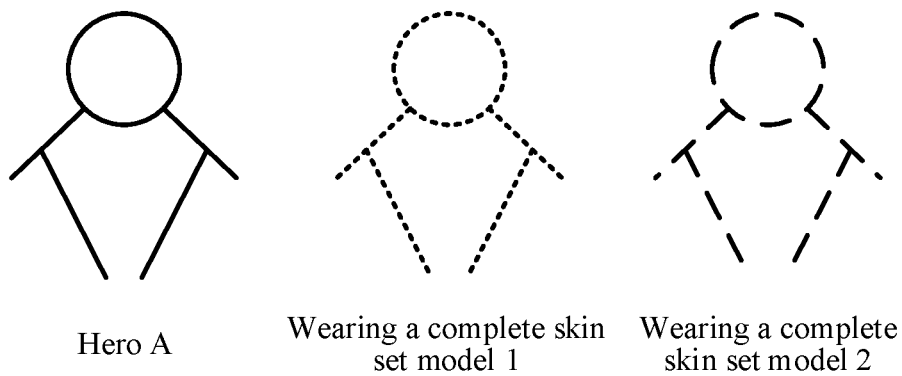
FIG. 1 is a schematic diagram of a complete skin set model according to the related art.

To make the objectives, technical solutions, and advantages of the present disclosure clearer, implementations of the present disclosure are further described below in detail with reference to the accompanying drawings.

First, some terms used in the embodiments of the present disclosure are briefly described.

A virtual world is displayed (provided) by a client when running on a terminal. The virtual world may be a simulated environment of the real world, or may be a semi-simulated semi-fictional three-dimensional environment, or may be a completely fictional three-dimensional environment. The virtual world may be any one of a two-dimensional virtual world, a 2.5-dimensional virtual world, and a three-dimensional virtual world. In one embodiment, the virtual world is further used for a virtual world battle between at least two virtual characters, and virtual resources available to the at least two virtual characters are provided in the virtual world. A MOBA game is used as an example. The virtual world is provided with a square map. The square map includes a lower left corner region and an upper right corner region that are symmetrical. Virtual characters on two opposing sides occupy the regions respectively, and the objective of each side is to destroy a target building deep in the opponent's region to win victory. In one embodiment, three lanes, namely, a top lane, a middle lane, and a bottom lane are formed symmetrically in the lower left corner region and upper right corner region. The lower left corner region and the upper right corner region may further be separated by a river.

A virtual character is a movable object in the virtual world. The movable object may be at least one of a virtual person, a virtual animal, and a cartoon person. In one embodiment, when the virtual world is a three-dimensional virtual world, the virtual characters are three-dimensional models. Each virtual character has a shape and a volume in the three-dimensional virtual world, and occupies some space in the three-dimensional virtual world. In one embodiment, the virtual character is a three-dimensional character constructed based on three-dimensional human skeleton technology. The virtual character wears different skin models to implement different appearances.

A MOBA game is a game in which several bases are provided in a virtual world, and users on different sides control virtual characters to battle in the virtual world, occupy bases or destroy the base of the opposing side. For example, in the MOBA game, the users may be divided into two opposing sides. The virtual characters controlled by the users are scattered in the virtual world to compete with each other, and the victory condition is to destroy or occupy all enemy bases. The MOBA game takes place in rounds. The duration of one round of the MOBA game is from a moment at which the game starts to a moment at which the victory condition is met.

A skin model is a material model used for changing the appearance of a virtual character. The same virtual character may have a plurality of different complete skin set models. The same skin model includes all or some items of a hairstyle, a face, an outfit, an armor, a weapon, a mount, and an accessory. In one embodiment, the skin model does not have a buff attribute for a character attribute of a virtual character in the virtual world. The character attribute includes at least one of health points, attack power, a defense value, and an armor value. In one embodiment, the skin model has a slight buff attribute for a character attribute of a virtual character in the virtual world, for example, adds 10 points of attack power.

A MOBA game based on a three-dimensional virtual world is used as an example for description. In the MOBA game, a virtual character that can be controlled by a player is generally referred to as a "hero". The same hero may have a plurality of complete skin set models. Each complete skin set model has a respective style. For example, a complete skin set model A has a hip-hop style, a complete skin set model B has a costume style, and a complete skin set model C has a future warrior style. When needing to switch between different complete skin set models, a user needs to change a whole skin of a hero. In one embodiment, each virtual character has a respective human skeleton model. The human skeleton model can ensure that the actions of the same virtual character are the same. The skin model is a skin model worn on the human skeleton model.

FIG. 1 shows the principle of changing a complete skin set model in the related art. A hero A may be provided with two completely different complete skin set models 1 and 2. When a user controls the hero A to wear the complete skin set model 1, the overall appearance of the hero A is changed to the appearance of the complete skin set model 1. When the hero A wears the complete skin set model 2, the overall appearance of the hero A is changed to the appearance of the complete skin set model 2.

Because a virtual character in the MOBA game is generally a virtual character in the three-dimensional virtual world, the virtual character is observed from different angles in the three-dimensional virtual world. Further, when the virtual character is in different forms in the three-dimensional virtual world, for example, is walking, driving, making an attack, or under attack, a complete skin set model worn by the virtual character may also present corresponding action effects. In addition, the complete skin set model worn by the virtual character may further have one or more effects. The effects include a moving effect, an invisibility effect, a death effect, a town-portal effect, an attack effect, a skill-casting effect, an effect of being hit by a skill, and the like. Therefore, a design process of a style, a texture, a map, an effect, and the like of a complete skin set model is relatively complex, and a design cycle of the complete skin set model may take several months. As a result, a data amount of one complete skin set model is also relatively large. Limited by the design cycle and the data amount, in the related art, the same virtual character is provided with only a limited quantity of complete skin set models for overall change. On one hand, it is difficult to meet personalized display requirements of complete skin set models of the same hero for a user. On the other hand, a data amount of each complete skin set model is relatively large. As a result, a data amount that needs to be stored by a client is also very large. For example, if there are hundreds of heroes in a MOBA game and each hero has 3 to 10 skin models, the client needs to store data of hundreds of different complete skin set models. As a result, the size of an installation package of the client keeps increasing, or the size of a routinely occupied space keeps increasing.

Different from the related art, the embodiments of the present disclosure provide a customized skin model for a virtual character. The customized skin model is divided into n skin components having the same style. Each skin component is independently designed. There is a technical solution in which at least one skin component is provided with a plurality of candidate skin component materials, n being a positive integer. A style and an effect are independently designed for each skin component when it is ensured that the art style and quality of the same customized skin model are kept unchanged. For the each skin component of the same customized skin model, a user may obtain $M1*M2* \ldots *M_n$ (n is a quantity of divided skin components, and $M_n$ is a candidate skin component material of an $n^{th}$ skin component) different personalized solutions.

Figure 2:
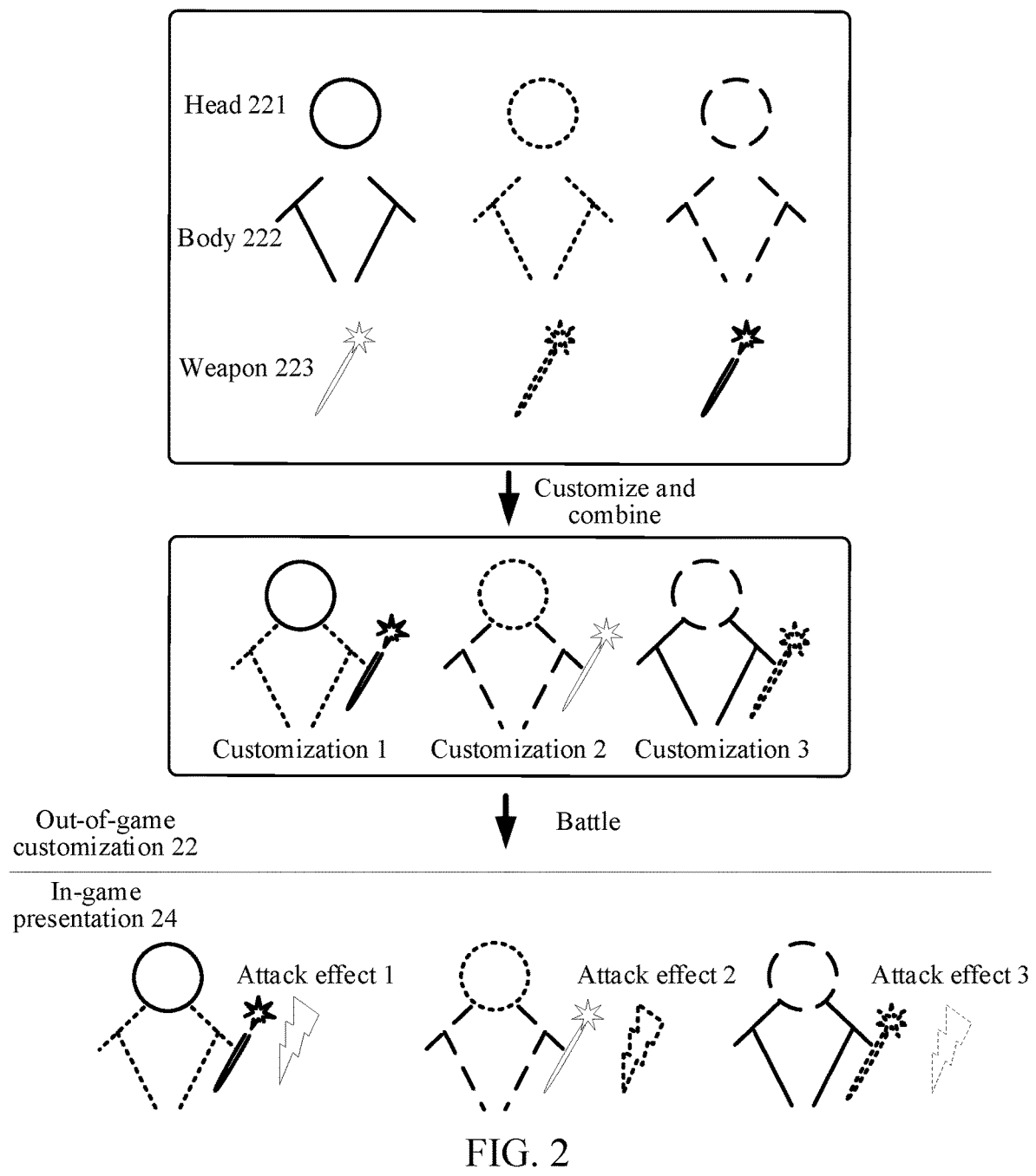
FIG. 2 is a schematic diagram of a customized skin model according to an exemplary embodiment of the present disclosure.

FIG. 2 is a schematic diagram of a customized skin model according to an exemplary embodiment of the present disclosure. The same customized skin model of a target virtual character may be divided into a total of three skin components, namely, a head 221, a body 222, and a weapon 223, which are independently designed. A plurality of candidate skin component materials having a similar style may be designed for the same skin component. In one embodiment, the different candidate skin component materials of the same skin component also have different effects. The effect includes at least one of a walking effect, an invisibility effect, an effect of an attack action, a skill-casting effect, and an effect of being attacked.

During out-of-game customization 22, a user may customize and combine candidate skin component materials that respectively correspond to the different skin components of the same customized skin model, to obtain a variety of customized combinations. For example, description is made by using an example in which the customized combinations include a personalization 1, a personalization 2, and a personalization 3 in FIG. 2. The personalization 1 includes a weapon 1, the personalization 2 includes a weapon 2, and the personalization 3 includes a weapon 3.

During in-game presentation 24, when a virtual character wears a customized skin model corresponding to the personalization 1, because the personalization 1 includes the weapon 1, when making an attack, the virtual character randomly or conditionally triggers an attack effect 1. When the virtual character wears a customized skin model corresponding to the personalization 2, because the personalization 2 includes the weapon 2, when making an attack, the virtual character randomly or conditionally triggers an attack effect 2. When the virtual character wears a customized skin model corresponding to the personalization 3, because the personalization 3 includes the weapon 3, when making an attack, the virtual character randomly or conditionally triggers an attack effect 3.

Figure 3:
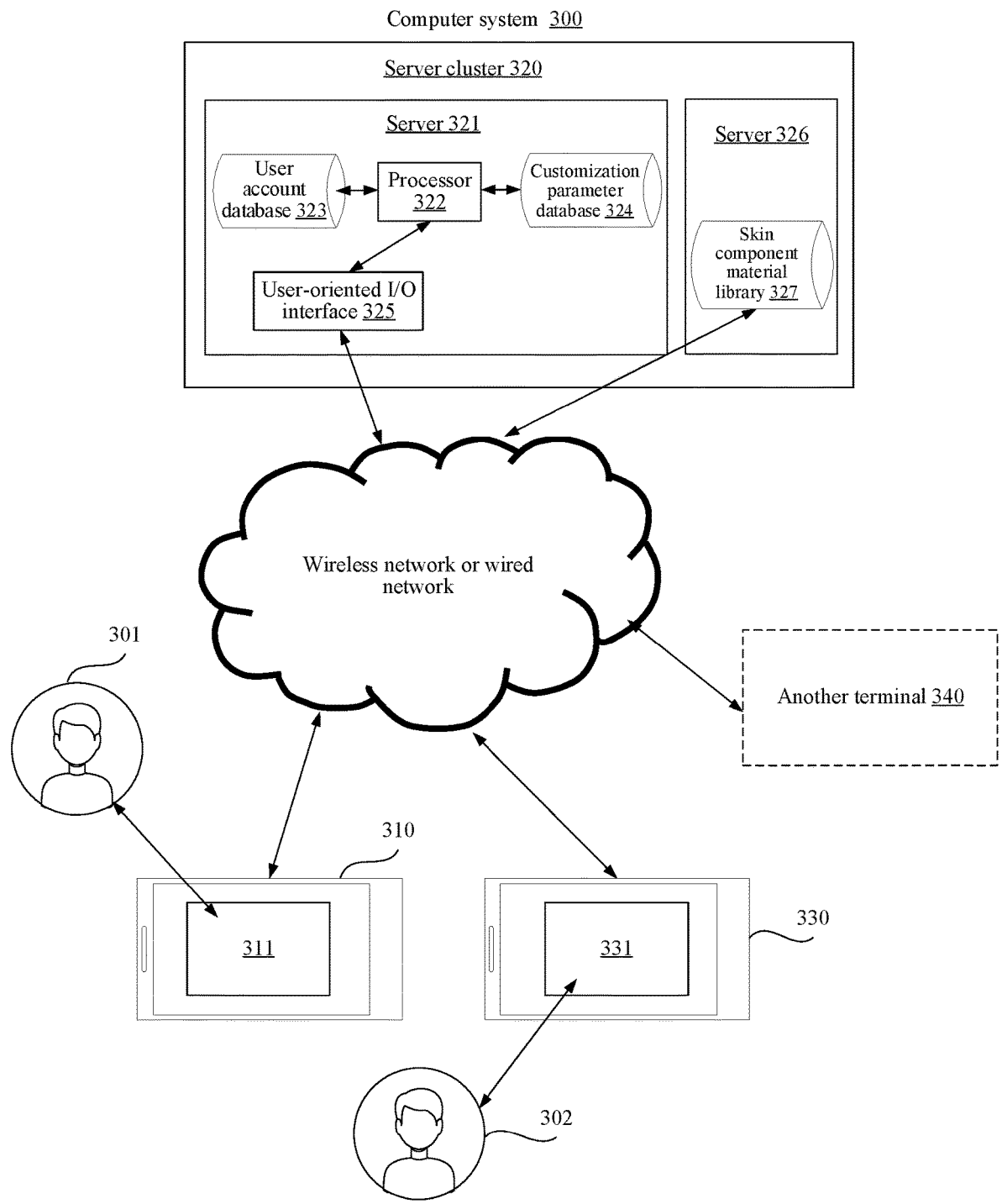
FIG. 3 is a structural block diagram of a computer system according to an exemplary embodiment of the present disclosure.

FIG. 3 is a structural block diagram of a computer system according to an exemplary embodiment of the present disclosure. A computer system 300 includes a first terminal 310, a second terminal 330, and a server cluster 320.

A client supporting a virtual world is installed and run on the first terminal 310. When the first terminal runs the client, a UI 311 of the client is displayed on a screen of the first terminal. The client may be any one of a military simulation game program, a MOBA game, or an SLG (simulated life game). The first terminal 310 is a terminal used by a first user 301. The first user 301 uses the first terminal 310 to control a first virtual character located in the virtual world to perform a movement. The movement includes, but is not limited to, at least one of body posture adjustment, crawling, walking, running, cycling, flying, jumping, driving, picking, shooting, attacking, and throwing. For example, the first virtual character is a first virtual person, for example, a simulated person character or a cartoon person character.

A client supporting a virtual world is installed and run on the second terminal 330. The client may be any one of a military simulation program, a MOBA game, or an SLG. When the second terminal runs the client, a UI 331 of the client is displayed on the screen of the first terminal. The second terminal 330 is a terminal used by a second user 302. The second user 302 uses the second terminal 330 to control a second virtual character located in the virtual world to perform a movement. For example, the second virtual character is a second virtual person, for example, a simulated person character or a cartoon person character.

In one embodiment, the first virtual person and the second virtual person are located in the same virtual world. In one embodiment, the first virtual person and the second virtual person may belong to the same side, the same team or the same organization, may be friends of each other, or may have a temporary communication permission. In one embodiment, the first virtual person and the second virtual person may belong to different sides, different teams or different organizations or may be enemies of each other.

In one embodiment, the clients installed on the first terminal 310 and the second terminal 330 are the same, or the clients installed on the two terminals are the same type of clients on different control system platforms. The first terminal 310 may be generally one of a plurality of terminals, and the second terminal 330 may be generally one of a plurality of terminals. In one embodiment, only the first terminal 310 and the second terminal 330 are used as an example for description. The first terminal 310 and the second terminal 330 are of the same or different device types. The device type includes at least one of a smartphone, a tablet computer, an e-book reader, an MP3 player, an MP4 player, a laptop, and a desktop computer.

FIG. 3 shows only two terminals. However, a plurality of other terminals 340 may access the server cluster 320 in different embodiments. In one embodiment, one or more terminals 340 are terminals corresponding to a developer. A developing and editing platform for the client of the virtual world is installed on the terminal 340. The developer may edit the client on the terminal 340 and transmit an edited client file to the server cluster 320 by using a wired or wireless network. The first terminal 310 and the second terminal 330 may download an update package corresponding to the client from the server cluster 320 to update the client.

The first terminal 310, the second terminal 330, and the another terminal 340 are connected to the server cluster 320 by a wireless network or a wired network.

The server cluster 320 includes at least one of one server, a plurality of servers, a cloud computing platform, and a virtualization center. The server cluster 320 is configured to provide a backend service for a client supporting a three-dimensional virtual world. In one embodiment, the server cluster 320 takes on primary computing work, and the terminals take on secondary computing work. Alternatively, the server cluster 320 takes on the secondary computing work, and the terminals take on the primary computing work. Alternatively, collaborative computing is performed by using a distributed computing architecture between the server cluster 320 and the terminals.

In a schematic example, the server cluster 320 includes a server 321 and a server 326. The server 321 includes a processor 322, a user account database 323, a customization parameter database 324, and a user-oriented input/output (I/O) interface 325. The processor 322 is configured to load instructions stored in the server 321, and process data in the user account database 323 and the customization parameter database 324. The user account database 323 is used for storing data of user accounts used by the first terminal 310 and/or the second terminal 330, for example, profile pictures of the user accounts, nicknames of the user accounts, combat power indices of the user accounts, and service regions where the user accounts are located. The customization parameter database 324 is configured to store customization parameters for user accounts to customize target virtual characters. The user-oriented I/O interface 325 is configured to establish communication with the first terminal 310 and/or the second terminal 330 by using a wireless network or wired network to exchange data. In one embodiment, a skin component material library 327 is disposed in the server 326. A client on the terminal may load n target skin component materials of the target virtual character from the skin component material library 327.

Figure 4:
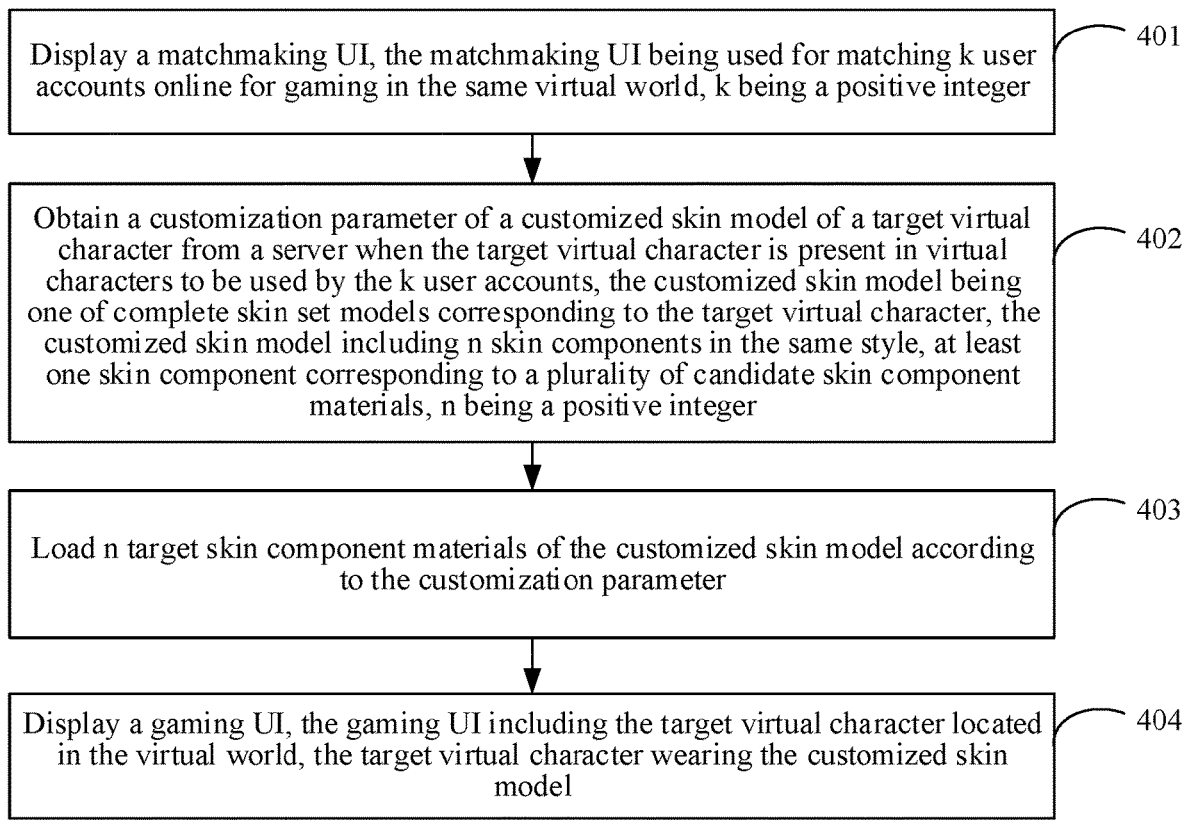
FIG. 4 is a flowchart of a method for displaying a skin of a virtual character according to an exemplary embodiment of the present disclosure.

FIG. 4 is a flowchart of a method for displaying a skin of a virtual character according to an exemplary embodiment of the present disclosure. The method may be applied to the foregoing first terminal or second terminal. The method includes the following steps:

Step 401: Display a matchmaking UI, the matchmaking UI being used for matching k user accounts online for gaming in the same virtual world, k being a positive integer.

A client providing a virtual world runs on the terminal, and the client may be a MOBA game client.

The client is provided with the matchmaking UI. For the MOBA game client, the matchmaking UI may be an interface used for matching two, six or ten user accounts online for gaming (e.g., competitive gaming) in the same virtual world. The two, six or ten virtual characters are on two opposing sides. The two sides have the same quantity of corresponding virtual characters. For example, there are five virtual characters on each side. The types of the five virtual characters may be a fighter character, an assassin character, a mage character, a support (or meat shield) character, and a marksman character respectively.

In one embodiment, the arena game is a MOBA game. The MOBA game is an arena game in which different virtual teams on at least two opposing sides occupy respective map regions on a map provided in a virtual world, and the victory condition is to destroy or occupy all bases on map regions corresponding to enemies. The battle arena game may take place in rounds. The same map or different maps may be used in different rounds of the battle arena game. Each virtual team includes one or more virtual characters, for example, one virtual character, there virtual characters or five virtual characters.

Figure 5:
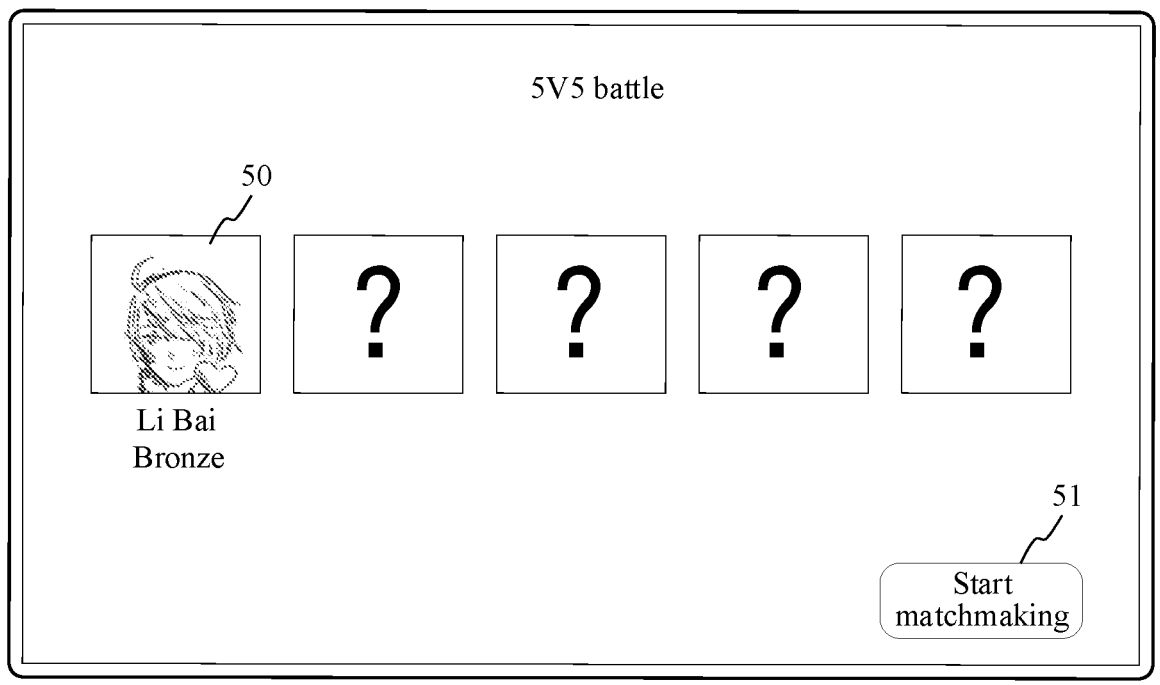
FIG. 5 is a schematic interface diagram of a matchmaking UI according to an exemplary embodiment of the present disclosure.

In one embodiment, at least one element of an arena type, a profile picture, a nickname, and a combat power level of a current user account (and a user account of a teammate), and a matchmaking trigger control is displayed on the matchmaking UI. As shown in the example in FIG. 5, an arena type "5V5", a profile picture 50 of a current user account, a nickname "Li Bai" of the current user account, a level "Bronze" of the current user account, and a "Start matchmaking" button 51 are displayed on the matchmaking UI. After a user taps/clicks the "Start matchmaking" button 51, the client transmits a matchmaking request to the server. The matchmaking request is used for requesting the server to match k user accounts online to play the MOBA game.

Step 402: Obtain a customization parameter of a customized skin model of a target virtual character from a server when the target virtual character is present in virtual characters used by the k user accounts (i.e., virtual characters to be controlled by the k user accounts in the upcoming game if matchmaking succeeds), the customized skin model being one of complete skin set models corresponding to the target virtual character, the customized skin model including n skin components in the same style, at least one skin component corresponding to a plurality of candidate skin component materials, n being a positive integer.

Each user account may freely select a virtual character to be used in a current round of battle. Alternatively, a server specifies or randomly selects a virtual character to be used in the current round of battle.

The customized skin model is a complete skin set model that is obtained by dividing a skin model into n skin components having the same style, providing a plurality of candidate skin component materials for at least one skin component, and then performing customization by a user according to the candidate skin component materials.

The server matches the k user accounts in the current round of battle arena game according to a matchmaking condition. The matchmaking condition includes, but is not limited to: combat power indexes of the k user accounts are the same or close, service regions where the k user accounts are located are the same service region, geographic regions where the k user accounts are located are the same geographic region, and network speed conditions of the k user accounts are better than a preset condition. Next, a user (or a server) of each user account selects or specifies a virtual character to be used in a current round of battle arena game.

After matchmaking succeeds and the virtual characters are selected, the server distributes character parameters of the k virtual characters in the current round of battle arena game to k clients. The character parameter of the virtual character includes, but is not limited to, at least one piece of information of an account, a nickname, a profile picture, a combat power level, and an IP address of the virtual character.

Skin models to be used by the k virtual characters may be default skin models, or may be complete skin set models for overall change, or may be customized skin models. In one embodiment, a skin model to be used by at least one target virtual character in the k virtual characters is a customized skin model. The customized skin model includes n skin components having the same style, at least one skin component corresponding to a plurality of candidate skin component materials.

In one embodiment, the target virtual character may be a virtual character controlled by a current user account, or may be a virtual character controlled by a user account of a teammate, or may be a virtual character controlled by a user account of an enemy.

For example, the customized skin model includes a total of four skin components, namely, a head, an outfit, a weapon, and an accessory. The same skin component has one or more candidate skin component materials. For example, the outfit part has a plurality of candidate outfit materials such as a red sport outfit, a green sport outfit, and a sport outfit co-branded with some brands.

In one embodiment, the customization parameter is used for indicating n target skin component materials of a customized skin model. In one embodiment, the customization parameter includes n component IDs. Each component ID is used for indicating a target skin component material of a corresponding skin component. A target skin component material of the same skin component may be selected from the plurality of candidate skin component materials.

An example in which the customized skin model includes the head, the outfit, the weapon, and the accessory is used. The customization parameter includes:

a head ID: XXXX;
a body ID: XXXX;
a weapon ID: XXXX; and
an accessory ID: XXXX.

In one embodiment, some items in the customization parameter may be optional. For example, the accessory ID may be empty.

Step 403: Load n target skin component materials of the customized skin model according to the customization parameter, an $i^{th}$ target skin component material being one of a plurality of skin component materials corresponding to an $i^{th}$ skin component, i being an integer less than or equal to n.

In one embodiment, the client loads the n target skin component materials of the customized skin model in a local material library according to the customization parameter.

In one embodiment, the client transmits a loading request to the server, the loading request carrying the customization parameter of the customized skin model. The server feeds back the n target skin component materials of the customized skin model to the client according to the customization parameter.

Step 404: Display a gaming UI, the gaming UI including the target virtual character located in the virtual world, the target virtual character wearing the customized skin model.

After matchmaking succeeds, the client enters the current round of game (e.g., a battle arena game). The client displays a gaming UI (e.g., battle UI), the gaming UI including an image of the virtual world observed from an observing angle of a virtual character controlled by the client.

Some gaming UIs include the target virtual character in the virtual world, the target virtual character wearing the customized skin model. The customized skin model is generated according to the n target skin component materials.

Figure 6:
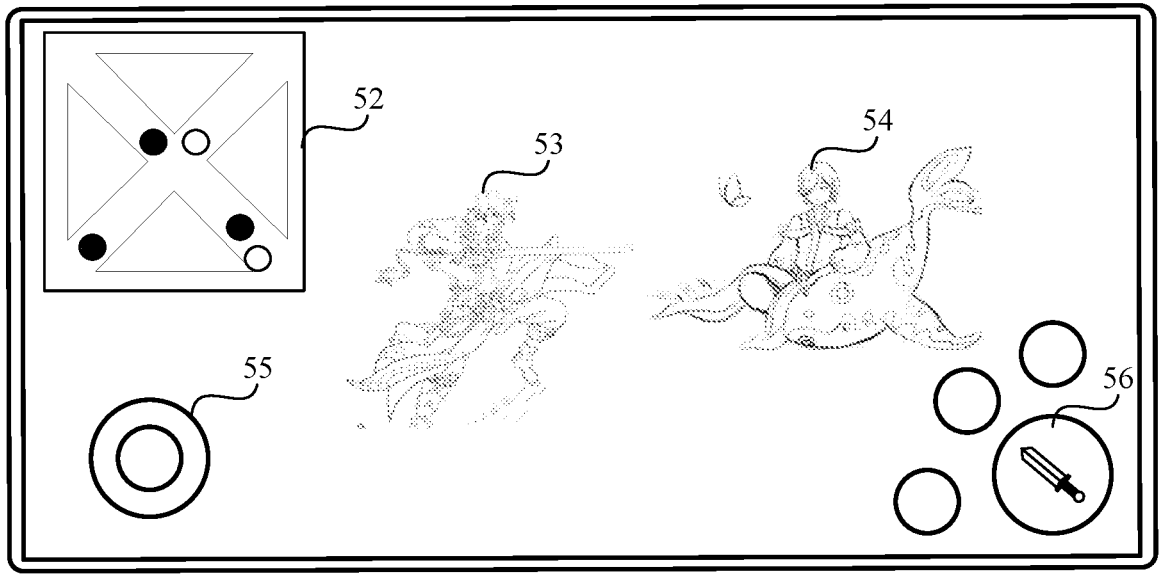
FIG. 6 is a schematic interface diagram of a gaming UI according to an exemplary embodiment of the present disclosure.

In one embodiment, at least one element of a global mini-map, the virtual character controlled by the current user account, the target virtual character, a direction control element, a skill control element, a neutral creature, and a building is displayed on the gaming UI. As shown in the example in FIG. 6, a global mini-map 52, a virtual character 53 controlled by the current user account, a target virtual character 54, a direction control element 55, and a skill control element 56 are displayed on the gaming UI. A customized skin model worn by the target virtual character 54 may be obtained by customizing a plurality of target skin component materials.

In summary, in the method provided in one embodiment, a suit customized skin model is divided into n skin components, and after matching k virtual characters in a current battle arena game, a client then obtains a customization parameter of a customized skin model of a target virtual character from a server, to load n target skin component materials of the customized skin model according to the customization parameter, and displays the target virtual character wearing the customized skin model in a gaming UI, so that after the same customized skin model of the same virtual character is divided into n skin components having the same style, each skin component is provided with a plurality of candidate skin component materials. For example, the each skin component is provided with m candidate skin component materials. At most $m^n$ customized skin models may be provided, so that a design cycle of a complete skin set model can be effectively shortened, to provide various personalized skin display effects for users while a design workload is reduced.

Figure 7:
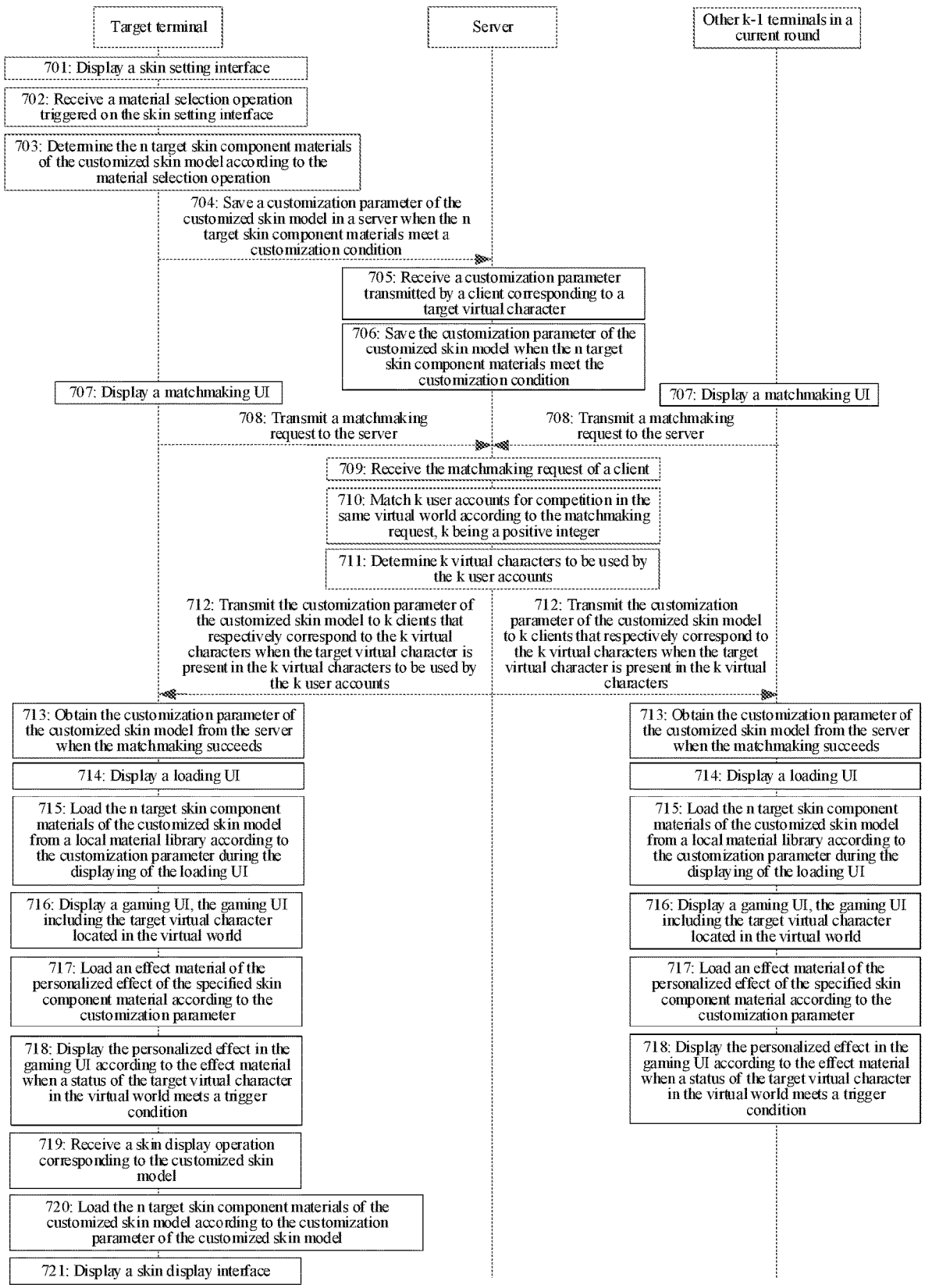
FIG. 7 is a flowchart of a method for displaying a skin of a virtual character according to another exemplary embodiment of the present disclosure.

FIG. 7 is a flowchart of a method for displaying a skin of a virtual character according to another exemplary embodiment of the present disclosure. In one embodiment, description is made by using an example in which the method is applied to the computer system shown in FIG. 3. The method includes the following steps:

Step 701: A target terminal displays a skin setting interface.

A user taps/clicks an icon of a client on the target terminal to start the client.

The client displays a skin setting interface according to an operation of the user. The skin setting interface is an interface for configuring and personalizing a customized skin model.

Customizable regions of n skin components of the customized skin model are displayed on the skin setting interface. Each skin component is provided with one or more candidate skin component materials for selection by a player. A manner of providing the candidate skin component material includes at least one of the following: a candidate skin component material is provided by default for use by a player, a candidate skin component material is provided within a limited time for use, a candidate skin component material is given to a player as a gift for use after a task is completed, a candidate skin component material is purchased with game currency, a candidate skin component material is given by a user account of a friend as a gift for use, a candidate skin component material is won from a draw for use, and a candidate skin component material is obtained by redeeming another item for use.

Figure 8:
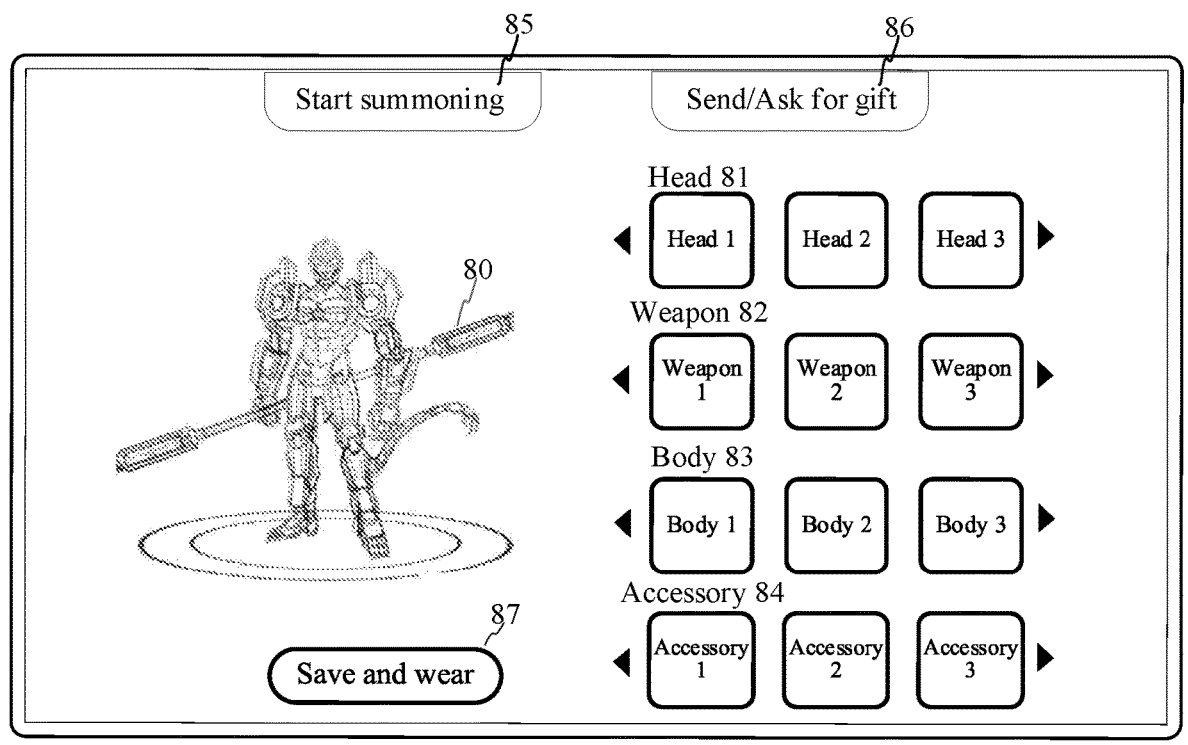
FIG. 8 is a schematic interface diagram of a skin setting interface according to an exemplary embodiment of the present disclosure.

For example, the target virtual character is Sun Wukong (Monkey King), and a customized skin model includes four skin components, namely, a head, a body, a weapon, and an accessory. Referring to FIG. 8, a target virtual character 80, a head component selection region 81, a weapon component selection region 82, a body component selection region 83, and an accessory component selection region 84 are displayed on the skin setting interface. In one embodiment, a "Start summoning" button 85, a "Send/Ask for gift" button 86, and a "Save and wear" button 87 are displayed on the skin setting interface. When a candidate skin component material is a skin component material that is not possessed by a current user account, a user may tap/click the "Start summoning" button 85 to purchase the skin component material, or may tap/click the "Send/Ask for gift" button 86 to ask for the skin component material from a user account of a friend.

The player selects target skin component materials that respectively correspond to the n skin components in the skin setting interface. For the same skin component, a target skin component material is selected by the player from a plurality of candidate skin component materials of the skin component.

Step 702: The target terminal receives a material selection operation triggered on the skin setting interface.

The material selection operation may be an operation triggered on a touchscreen. In one embodiment, the material selection operation is a tap/click operation of selecting a candidate skin component material in a customizable region.

Step 703: The target terminal determines the n target skin component materials of the customized skin model according to the material selection operation.

The target terminal receives a material selection operation of a user. The target terminal determines the n target skin component materials of the customized skin model according to the material selection operation.

In one embodiment, the material selection operation of the user is an operation of selecting one or several skin component materials from the n target skin component materials. That is, during one customization, the user may select candidate skin component materials of only some skin components. For example, during one customization, the user may change only a head component material. In another example, during another customization, the user may change only the head component material and a weapon component material. When the user selects the candidate skin component material of only some skin components, initial selection of the other skin component materials may be kept.

In one embodiment, the material selection operation of the user is an operation of selecting target skin component materials corresponding to the n skin components. That is, the user may change or select the n target skin component materials separately.

Step 704: The target terminal saves a customization parameter of the customized skin model in a server when the n target skin component materials meet a customization condition.

After the material selection operation of the user ends, the target terminal determines whether the n target skin component materials of the customized skin model meet the customization condition.

The customization condition includes, but is not limited to, at least one of the following:

1. A current user account has the permission to use the target skin component material.

The target skin component material may be obtained in a plurality of manners, for example, is provided by default, is given as a gift, awarded for a task, won from a draw, and is obtained through redemption. The current user account needs to have the permission to use the target skin component material before the user account can use the target skin component material for customization.

2. A use time of the target skin component material is within a valid period.

A use time of at least one target skin component material is within the valid period. For example, a first target skin component material is valid within 10 days after redemption. In another example, a second target skin component material is valid within only a holiday period.

3. Styles of the n target skin component materials meet a compatibility condition.

To maintain a uniform overall style of the same customized skin model, the client may further detect whether the styles of the n target skin component materials meet the compatibility condition. The compatibility condition is a condition of maintaining the uniformity of styles of different skin components of the same customized skin model. For example, different skin components of a sport style meet the compatibility condition. In another example, different skin components of a futuristic style meet the compatibility condition.

When the customization condition is met, the target terminal transmits a save request to the server, the save request carrying the customization parameter corresponding to the n target skin component materials. When the customization condition is not met, the target terminal displays error prompt information, or the target terminal displays n target skin component materials for a recommended customization according to the customization condition.

In one embodiment, when a suit customized skin model is divided into n skin components, the customization parameter may include n component IDs. Each component ID corresponds to a skin component of one part, and different component IDs correspond to skin components of different parts. That is, component IDs correspond to skin components in a one-to-one manner.

For example, the customized skin model includes a total of four skin components, namely, a head, a body, a weapon, and an accessory. The customization parameter of the customized skin model includes a head ID, a body ID, a weapon ID, and an accessory ID.

In one embodiment, in some embodiments, each skin component material further corresponds to three-dimensional stitching coordinates. The three-dimensional stitching coordinates are used for indicating coordinate positions of the skin component material being stitched to a corresponding part of the customized skin model.

Step 705: A server receives a customization parameter transmitted by a client corresponding to a target virtual character.

The server receives the save request transmitted by a target terminal. A client corresponding to the target virtual character runs on the target terminal. In one embodiment, the server receives the save request transmitted by a target terminal, the save request carrying the customization parameter of the customized skin model, the customization parameter being used for indicating n target skin component materials of the customized skin model, n being a positive integer.

The server determines whether the n target skin component materials indicated by the customization parameter meet the customization condition.

The customization condition includes, but is not limited to, at least one of the following:

1. A current user account has the permission to use the target skin component material.

The target skin component material may be obtained in a plurality of manners, for example, is provided by default, is given as a gift, awarded for a task, won from a draw, and is obtained through redemption. The current user account needs to have the permission to use the target skin component material before the user account can use the target skin component material for customization.

2. A use time of the target skin component material is within a valid period.

A use time of at least one target skin component material is within the valid period. For example, a first target skin component material is valid within 10 days after redemption. In another example, a second target skin component material is valid within only a holiday period.

3. Styles of the n target skin component materials meet a compatibility condition.

To maintain a uniform overall style of the same customized skin model, the client may further detect whether the styles of the n target skin component materials meet the compatibility condition. The compatibility condition is a condition of maintaining the uniformity of styles of different skin components of the same customized skin model. For example, different skin components of a sport style meet the compatibility condition. In another example, different skin components of a futuristic style meet the compatibility condition.

When the customization condition is met, step 706 is performed. When the customization condition is not met, the server transmits error prompt information to the target terminal, or the server transmits n target skin component materials for a recommended customization to the target terminal.

Step 706: Save the customization parameter of the customized skin model when the n target skin component materials meet the customization condition.

The server may save the customization parameter corresponding to the n target skin component materials of the target virtual character. For example, as shown in the following Table 1:

TABLE 1

| User account | Virtual character | Customization parameter |
| --- | --- | --- |
| North American Miss Charming | Shangxiang | Head ID: 0121, Body ID: 1254 Weapon ID: 2562, Accessory ID: 3652 |
| Radio Kitty | Sun Ali | Head ID: 0133, Body ID: 1584 Weapon ID: 2987, Accessory ID: 3666 |
| Charming chief | Cao Cao | Head ID: 0098, Body ID: 1656 Weapon ID: 2589, Accessory ID: 3954 |
| Innocent king of games | Liang Zhuge | Head ID: 0001, Body ID: 1654 Weapon ID: 2987, Accessory ID: 3741 |

In one embodiment, the server stores a correspondence among a user account, a virtual character name, and a customization parameter of a customized skin model. In an embodiment, the server stores the correspondence in a customization parameter database.

Step 707: The target terminal displays a matchmaking UI. Alternatively, step 707 may be: The other k-1 terminals in a current round display a matchmaking UI.

Using an example in which a client provides a MOBA game. The MOBA game is a battle arena game that take place in rounds.

When a user needs to start a round of game, the client displays a matchmaking UI according to an operation of the user. The matchmaking UI may be an interface used for matching two, six or ten virtual characters online for gaming in the same virtual world. The two, six or ten virtual characters are on two opposing sides. The two sides have the same quantity of corresponding virtual characters. For example, there are five virtual characters on each side. The types of the five virtual characters may be a fighter character, an assassin character, a mage character, a support (or meat shield) character, and a marksman character respectively.

Figure 9:
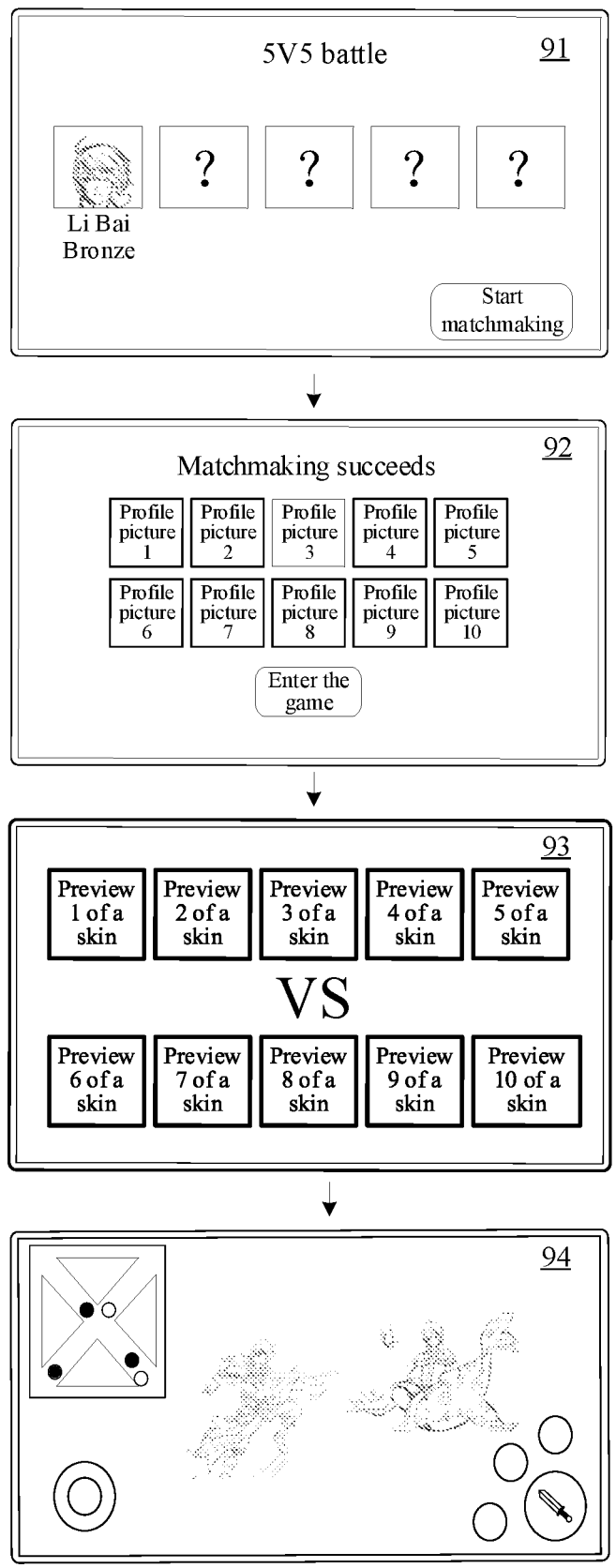
FIG. 9 is a schematic interface diagram of a method for displaying a skin of a virtual character according to an exemplary embodiment of the present disclosure.

As shown in FIG. 9, a terminal displays a matchmaking UI 91. A "Start matchmaking" button is displayed on the matchmaking UI 91. A user may tap/click the "Start matchmaking" button to trigger an online matchmaking process.

Step 708: The target terminal transmits a matchmaking request to the server. Alternatively, step 708 may be: The other k-1 terminals in the current round transmit the matchmaking request to the server.

After the user taps/clicks the "Start matchmaking" button, the target terminal and the other k-1 terminals transmit the matchmaking request to the server. In one embodiment, the matchmaking request carries a user account that is logged in on a current terminal.

Step 709: The server receives a matchmaking request of a client.

The server may receive matchmaking requests of a plurality of clients. The matchmaking requests carry corresponding user account.

Step 710: The server matches k user accounts for gaming in the same virtual world according to the matchmaking request, k being a positive integer.

After receiving the plurality of matchmaking requests, the server extracts the user accounts in the matchmaking requests. The server further searches a user account database for attribute information of the user account according to the user account. The attribute information includes, but is not limited to, at least one piece of information of a profile picture, a nickname, a gender, a combat power index, an account level, a service region where the account is located, and a region where the account is located.

In one embodiment, the server matches the k user accounts in the current round of battle arena game according to a matchmaking condition. The matchmaking condition includes, but is not limited to: combat power indexes of the k user accounts are the same or close, service regions where the k user accounts are located are the same service region, geographic regions where the k user accounts are located are the same geographic region, and network speed conditions of the k user accounts are better than a preset condition.

Step 711: The server determines k virtual characters to be used by the k user accounts.

In one embodiment, after the matchmaking succeeds, a user of each user account selects or specifies a virtual character to be used in a current round of battle arena game. In some embodiments, the virtual character to be used by the each user account may further be specified or randomly obtained by the server.

In one embodiment, the server transmits the attribute information of the k user accounts to terminals that respectively correspond to the k user accounts together.

Step 712: The server transmits the customization parameter of the target virtual character to k clients that respectively correspond to the k virtual characters when the target virtual character is present in the k virtual characters.

The target virtual character is a virtual character wearing a customized skin model.

When there are one or more target virtual characters in the k virtual characters in the current round of battle arena game, the server respectively transmits a customization parameter of a customized skin model of each target virtual character to the k clients. The customized skin models of the target virtual characters may be different from each other.

Step 713: The target terminal obtains the customization parameter of the customized skin model from the server when the matchmaking succeeds. Alternatively, step 713 may be: The other k-1 terminals in the current round obtains the customization parameter of the customized skin model from the server when the matchmaking succeeds.

The target terminal and the other k-1 terminals in the current round receive the customization parameter of the customized skin model transmitted by the server. In one embodiment, the customization parameter of the customized skin model includes a total of four component IDs, namely, a head ID, a body ID, a weapon ID, and an accessory ID.

Step 714: The target terminal displays a loading UI. Alternatively, Step 714 may be: The other k-1 terminals in the current round display a loading UI.

When the matchmaking succeeds, the target terminal and the other k-1 terminals further display the loading UI. The loading UI is a transition interface displayed by a terminal when the server loads various resources needed in the current round of battle arena game. In one embodiment, a preview of the customized skin model is also displayed on the loading UI.

For example, referring to FIG. 9, a preview of the k virtual characters is played on the loading UI 93. When a skin model worn by a virtual character is a default skin model, the preview is a preview corresponding to the default skin model. When a skin of the virtual character is a complete skin set model for overall change, the preview is a preview corresponding to the complete skin set model.

When the skin model worn by the virtual character is a customized skin model, because the client may not store a corresponding skin preview, the preview corresponding to the default skin model may be used temporarily for display.

Alternatively, some specified customized skin models have corresponding previews. The client stores a correspondence between a specified parameter and a preview, and obtains a preview corresponding to a specified parameter from a local material library when the specified parameter is present in the customization parameters of the customized skin model. When the customization parameter includes a plurality of component IDs, the specified parameter may be one or more component IDs in the plurality of component IDs. For example, when a specified head ID is present in the customization parameter, a preview of a customized skin model corresponding to the specified head ID is obtained. In another example, when a specified head component ID and an outfit ID are present in the customization parameter, a preview of a customized skin model corresponding to "the head ID and the outfit ID" is obtained.

Alternatively, the client obtains a preview of the customized skin model from the server, the preview being generated by the server for the customized skin model according to the customization parameter. For example, when transmitting the customization parameter of the customized skin model to the client, the server transmits the preview corresponding to the customized skin model to the client at the same time.

Step 715: The target terminal loads n target skin component materials of the customized skin model from a local material library according to the customization parameter. Alternatively, step 715 may be: Other k-1 terminals in the current round load n target skin component materials of the customized skin model from a local material library according to the customization parameter.

Clients (which are also referred to as clients) of the target terminal and the other k-1 terminals store the local material library. All or some of candidate skin component materials may be stored in the local material library. In one embodiment, a correspondence between a component ID and a skin component material is stored in the local material library. The target terminal/the other k-1 terminals extracts/extract component IDs of the n target skin component materials according to the customization parameter of the customized skin model; and extracts/extract the n target skin component materials of the customized skin model according to the correspondence in the local material library and the n component IDs.

In another possible implementation, when all or some of the skin component materials are not stored in the local material library, during the displaying of the loading UI, the target terminal/the other k-1 terminals transmits/transmit a material obtaining request to the server, the material obtaining request carrying the customization parameter. In one embodiment, if the terminal stores component IDs of some skin component materials, the material obtaining request carries only IDs of skin component materials that are not stored locally.

The server receives the material obtaining request, extracts the customization parameter from the material obtaining request, and then extracts the n target skin component materials of the customized skin model from a skin component material library according to the customization parameter.

The server transmits the n target skin component materials of the customized skin model to the k terminals. In one embodiment, if only some terminals transmit the material obtaining request to the server, the server may only transmit feedbacks to the terminals transmitting the material obtaining request.

In one embodiment, if the material obtaining request carries only component IDs corresponding to some skin component materials, the server only needs to feed back target skin component materials corresponding to the component IDs. Correspondingly, the target terminal and the other k-1 terminals receive the n target skin component materials of the customized skin model that are fed back by the server according to the customization parameter. The target terminal receives the n target skin component materials fed back by the server, and then loads the n target skin component materials. In one embodiment, the each skin component material includes at least one element of a map style, a texture style, a light and shadow effect, and a component coordinate.

In one embodiment, the target terminal further loads a skin material (for example, materials of a default skin model, or materials of a complete skin set model for overall change) worn by another virtual character, attribute information of each user account, and various other information required in the current round of battle arena game.

Step 716: The target terminal displays a gaming UI, the gaming UI including the target virtual character located in the virtual world, the target virtual character wearing the customized skin model. Alternatively, step 716 may be: the other k-1 terminals in the current round display a gaming UI, the gaming UI including the target virtual character located in the virtual world, the target virtual character wearing the customized skin model.

After the various information required in the current round of battle arena game is loaded, the k terminals all display the gaming UI, the gaming UI including the target virtual character located in the virtual world, the target virtual character wearing the customized skin model.

The gaming UI includes an image in which the virtual world is observed from an observing angle of a virtual character controlled by the client. In one embodiment, the gaming UI further includes the target virtual character located in the virtual, and the target virtual character wears the customized skin model.

In one embodiment, at least one element of a global mini-map, the virtual character controlled by the current user account, the target virtual character, a direction control element, a skill control element, a neutral creature, and a building is displayed on the gaming UI. As shown in the example in FIG. 9, a global mini-map, a virtual character controlled by the current user account, a target virtual character, a direction control element, and a skill control element are displayed on a gaming UI 94. A customized skin model worn by the target virtual character may be obtained by customizing a plurality of target skin component materials.

In one embodiment, if the target virtual character is not the virtual character controlled by the current user account, the target virtual character appears in the gaming UI within a time period, and the target virtual character does not appear within another time period.

In one embodiment, a game stage may be referred to as an in-game presentation for short, and an out-of-game stage may be referred to as an out-of-game presentation for short.

Step 717: The target terminal loads an effect material of a personalized effect of a specified skin component material according to the customization parameter. Alternatively, step 717 may be: The other k-1 terminals in the current round load an effect material of a personalized effect of a specified skin component material according to the customization parameter.

The customized skin model includes target skin component materials of n different skin components. In one embodiment, at least one specified skin component material in the n target skin component materials has a personalized effect, the personalized effect including at least one of a moving effect, an invisibility effect, an attack effect, a skill-casting effect, a town-portal effect, and an effect of being attacked.

For example, the specified skin component materials are one or more of a head component material, a body component material, a weapon component material, and an accessory component material. In an embodiment, for a plurality of candidate skin component materials of the same skin component, only some specified candidate skin component materials may have personalized effects, and the other non-specified candidate skin component materials do not have a personalized effect. In another embodiment, different candidate skin component materials have different personalized effects.

The moving effect is an effect that is displayed in a superimposed manner on or near a specified skin component material when the target virtual character is in a moving state. For example, when the movement speed of the specified head component material is greater than a preset speed, the eyes of the specified head component material have a light effect. In another example, the movement speed of the specified head component material is greater than a preset speed, the specified head component material forms a body light and shadow trajectory corresponding to a body color.

The invisibility effect is an effect displayed in a superimposed manner on or near a specified skin component material when the target virtual character is in an invisible or semi-invisible state. For example, when in underbrush, the target virtual character forms a contour light and shadow trajectory corresponding to a body color.

The attack effect is an effect displayed in a superimposed manner on or near a specified skin component material when the target virtual character is in an attack state. For example, when the target virtual character makes a heavy attack, an animation effect that the ground breaks open near the specified body component material is produced.

The skill-casting effect is an effect displayed in a superimposed manner on or near a specified skin component material when the target virtual character casts a skill. For example, when a target virtual character casts a teleport skill, a lightning pattern is displayed in a position before the specified body component material teleports. In another example, when the target virtual character casts a ground piercing skill, a green vine pattern is superimposed in a front region of the specified weapon component material.

The town-portal effect is an effect displayed in a superimposed manner on or near the specified skin component material when the target virtual character is being transported. For example, for the duration of a return process of the target virtual character, a flower falling pattern is superimposed near the specified body component material.

The effect of being attacked is an effect displayed in a superimposed manner on or near a specified skin component material when the target virtual character is being attacked. For example, when the target virtual character is being attacked by ice and snow, a crystal forming effect is superimposed and displayed on the specified body component material.

Step 718: The target terminal displays the personalized effect in the gaming UI according to the effect material when a status of the target virtual character in the virtual world meets a trigger condition. Alternatively, step 718 may be: The other k-1 terminals in the current round display the personalized effect in the gaming UI according to the effect material when a status of the target virtual character in the virtual world meets a trigger condition.

In one embodiment, the personalized effect appears randomly, and/or appears when the status of the target virtual character meets the trigger condition.

The personalized effect is displayed in the gaming UI according to the effect material when the status of the target virtual character in the virtual world meets the trigger condition.

Step 719: The target terminal receives a skin display operation of the customized skin model.

At an out-of-game stage, the target terminal may further provide a character display interface of each virtual character. In a character display interface of the same virtual character, a user may select different skin models of the virtual character for display. The different skin models include at least one of a default skin model, a complete skin set model for overall change, and a customized skin model.

The user may perform a skin display operation on the character display interface. The skin display operation is used for triggering the display of a skin of the target virtual character. In one embodiment, description is made by using an example in which the skin display operation is used for triggering the display of the customized skin model of the target virtual character.

In one embodiment, the target terminal stores the customization parameter of the customized skin model.

Step 720: The target terminal loads the n target skin component materials of the customized skin model according to the customization parameter of the customized skin model.

The target terminal stores a local material library. All or some of candidate skin component materials may be stored in the local material library. In one embodiment, a correspondence between a component ID and a skin component material is stored in the local material library. The target terminal extracts component IDs of the n target skin component materials according to the customization parameter of the customized skin model; and extracts the n target skin component materials that respectively correspond to the n component IDs according to the correspondence in the local material library and the n component IDs.

When a corresponding target skin component material is not stored in the local material library of the target terminal, the target terminal transmits a material obtaining request to the server. The material obtaining request carries all or some of the customization parameters. In one embodiment, if the terminal stores IDs of some skin component materials, the material obtaining request carries only IDs of skin component materials that are not stored locally. The server receives the material obtaining request, extracts the customization parameter from the material obtaining request, and then extracts the n target skin component materials of the customized skin model from a skin component material library according to the customization parameter. The server transmits all or some of the n target skin component materials to the target terminal.

Step 721: The target terminal displays a skin display interface.

After obtaining the n target skin component materials, the target terminal displays the skin display interface. The target virtual character wearing the customized skin model is displayed on the skin display interface. In one embodiment, a three-dimensional rotating display stand is displayed on the skin display interface, and the target virtual character wearing the customized skin model stands in the three-dimensional rotating display stand. When a user performs a touch operation to rotate the three-dimensional rotating display stand, the target virtual character wearing the customized skin model rotates with the three-dimensional rotating display stand, to display the customized skin model from different angles.

In summary, in the method provided in one embodiment, a suit customized skin model is divided into n skin components, and after matching k virtual characters in a current battle arena game, a client then obtains a customization parameter of a customized skin model of a target virtual character from a server, to load n target skin component materials of the customized skin model, and displays the target virtual character wearing the customized skin model in a gaming UI, so that after the same customized skin model of the same virtual character is divided into n skin components having the same style, each skin component is provided with a plurality of candidate skin component materials. For example, the each skin component is provided with m candidate skin component materials. At most $m^n$ customized skin models may be provided, so that a design cycle of a complete skin set model can be effectively shortened, to provide various personalized skin display effects for users while a design workload is reduced.

In the method provided in one embodiment, a personalized effect is designed for a specified skin component material in the n target skin component materials, to make a target virtual character wearing the specified skin component material present a relatively obvious effect of effect presentation during in-game presentation. Because an area occupied by the target virtual character in the gaming UI is relatively small, and coverage of a personalized effect may be relatively large, the personalization of the target virtual character during a battle may be enhanced by using the personalized effect while a manner of providing an effect with a skin component as granularity is also provided.

In addition, the client may not store each skin material of the target virtual character locally, and pull the n target skin component materials of the target virtual character from the server when the each skin material needs to be displayed in the current round of battle arena game, to effectively reduce an amount of customization parameters that need to be stored by the client, and reduce a data amount of an installation package or a data amount of routinely occupied storage of the client.

Figure 10:
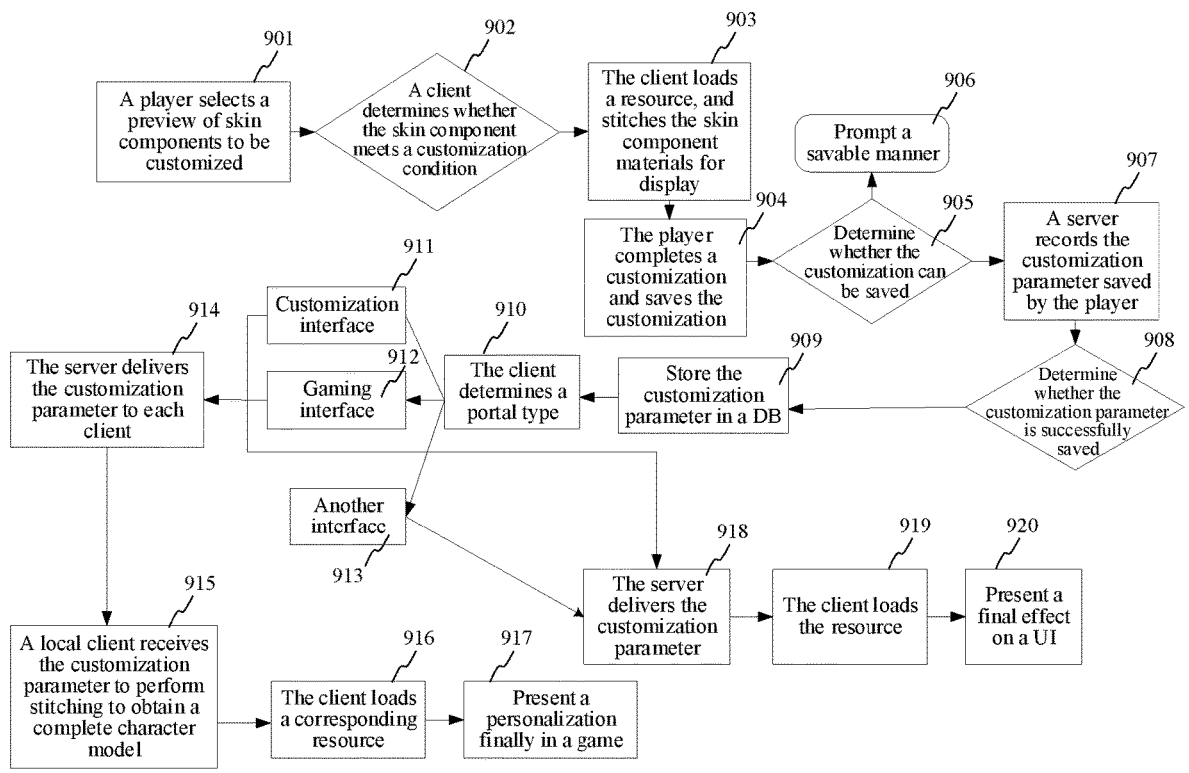
FIG. 10 is a flowchart of a method for displaying a skin of a virtual character according to an exemplary embodiment of the present disclosure.

FIG. 10 is a flowchart of a method for displaying a skin of a virtual character according to another exemplary embodiment of the present disclosure. The method may be applicable to the computer system described above. Referring to FIG. 10, the method includes the following steps:

S901: A player selects a preview of components to be customized.

A client displays a skin setting interface, the skin setting interface being an interface for personalizing a customized skin model of a target virtual character.

Customizable regions of n skin components of the customized skin model are displayed on the skin setting interface. Each skin component is provided with one or more skin component materials for selection by the player. The player selects target skin component materials of the n skin components in the skin setting interface. For the same skin component, a target skin component material is selected by the player from a plurality of candidate skin component materials.

S902: A client determines whether the skin component meets a customization condition.

After receiving a selection operation of the player, the client needs to determine whether target skin component materials of the same customized skin model meet the customization condition.

When a determination result is that the customization condition is met, step S903 is performed. When the determination result is that the customization condition is not met, the client pops up prompt information showing that the customization condition is not met.

S903: The client loads a resource, and stitches the skin component materials for display.

The player selects all or some of the n skin component materials of the customized skin model in the skin setting interface. As shown in FIG. 8, when the client determines that the n skin component materials all meet the customization condition, a component preview 80 of personalized target skin component materials is provided in a left region of the skin setting interface.

Figure 11:
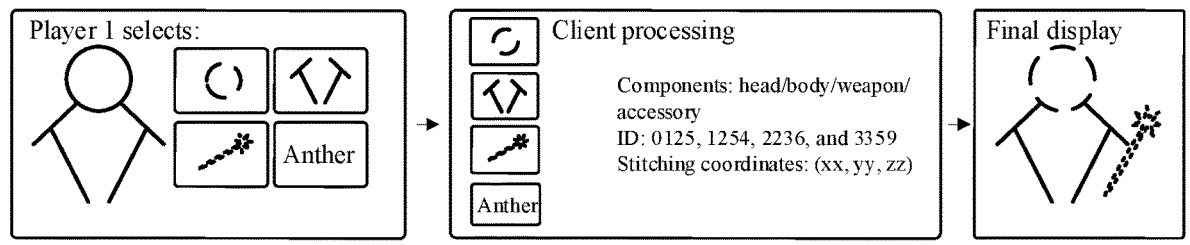
FIG. 11 is a schematic diagram of setting a customized skin model according to an exemplary embodiment of the present disclosure.

As shown in FIG. 11, a player 1 may select target skin component materials of skin components such as a head, a body, and a weapon of a customized skin model, and then the client generates a customization parameter of the customized skin model according to the n target skin component materials, and may then display a finally displayed customized skin model on the skin setting interface of the client.

S904: The player completes a customization and saves the customization.

After completing a customization, the player may save the customization parameter after the customized skin model is personalized.

For example, the skin components of the customized skin model include a head, a body, a weapon, and an accessory. The customization parameter of the target virtual character includes a total of four component IDs, namely, a head ID, a body ID, a weapon ID, and an accessory ID. In one embodiment, the customization parameter further includes three-dimensional stitching coordinates of each skin component material.

Figure 12:
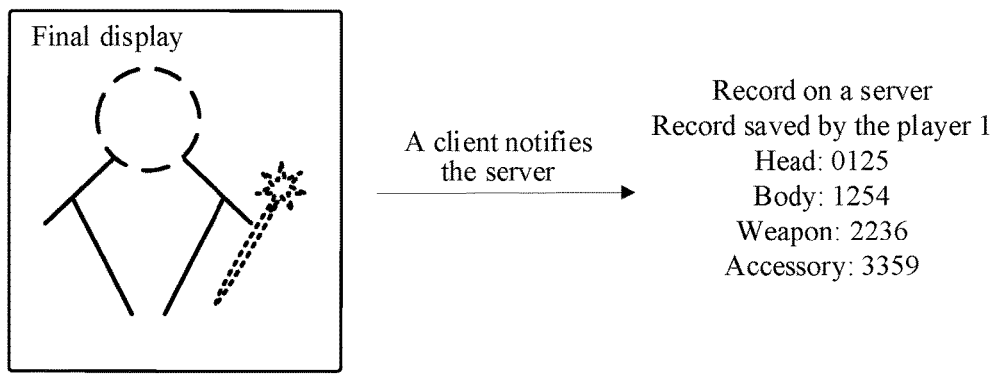
FIG. 12 is a schematic diagram of saving a customized skin model according to an exemplary embodiment of the present disclosure.

As shown in FIG. 12, the player 1 may save the customization parameter of the customized skin model in a server by using the client. The server may save the customization parameter of the customized skin model. For example, the customization parameter includes a head ID "0125", a body ID "1254", a weapon ID "2236", and an accessory ID "3359".

S905: A server determines whether the customization parameter can be saved.

The server determines whether the target skin component materials meet the customization condition.

When a determination result is that the customization condition is met, step S907 is performed. When the determination result is that the customization condition is not met, step 906 is performed.

S906: The server prompts a savable manner.

If the customization condition is not met, the server recommends, according to available skin component materials of a current user account, component IDs of the n target skin component materials meeting the customization condition to the client.

S907: The server records the customization parameter saved by the player.

If the customization condition is met, the server records the customization parameter saved by the player.

S908: The server determines whether the customization parameter is successfully saved.

After the record operation is performed, the server determines whether the current customization parameter is successfully saved. When the customization parameter is successfully saved, S909 is performed.

S909: The server stores the customization parameter in a database (DB).

The server stores the customization parameter of the target virtual character in a customization parameter database. In one embodiment, the server stores a user account of the player, a character ID of the target virtual character, the customization parameters of the customized skin model of the target virtual character in the customization parameter DB according to the correspondence.

S910: The client determines a portal type, the portal type including a customization interface 911, a battle interface 912, and another interface 913.

The client in a running process is triggered by a user to enter different UIs. The different UIs may have different portal types. The portal is that a UI is a portal with a function. In one embodiment, the portal type includes the customization interface 911, the battle interface 912, and the another interface 913. The customization interface 911 is an interface portal for customizing a customized skin model. The battle interface 912 is an interface portal of using a target virtual character wearing the customized skin model for a battle arena game. The another interface 913 is an interface portal having a requirement of displaying the customized skin model.

When the portal type is the battle interface 912, steps S914 to S917 are performed. When the portal type is the customization interface 911 and the another interface 913, steps S918 to S920 are performed.

S914: The server delivers the customization parameter to each client.

When the portal type is the battle interface 912, because k virtual characters are required for a battle arena game at the same time, the k virtual characters need to display the skin of customized skin model of the target virtual character. The server delivers the customization parameter to clients that respectively correspond to the k virtual characters.

S915: A local client receives the customization parameter to perform stitching to obtain a complete character model.

The clients that respectively correspond to the k virtual characters receive the customization parameter transmitted by the server. Stitching is performed according to the customization parameter to obtain the complete character model of the target virtual character.

S916: The client loads a corresponding resource.

The clients of the k virtual characters load n target skin component materials of the customized skin models locally and/or in the server according to the customization parameters.

S917: Present a personalization finally in a game.

The clients of the k virtual characters present the customized skin model of the target virtual character during the battle arena game according to the n target skin component materials.

S918: The server delivers the customization parameter.

When the portal type is the customization interface 911 or the another interface 913, the server delivers the customization parameter to the client corresponding to the target virtual character.

S919: The client loads the resource.

The client corresponding to the target virtual character loads n target skin component materials of the customized skin model according to the customization parameters.

S920: Present a final effect on a UI.

The client corresponding to the target virtual character displays the customized skin model of the target virtual character on the customization interface or another UI.

Figure 13:
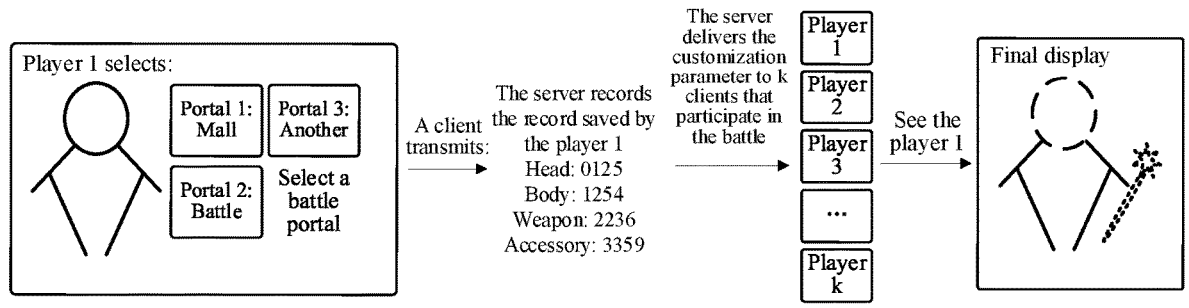
FIG. 13 is a schematic interface diagram of implementing a customized skin model during in-game presentation according to an exemplary embodiment of the present disclosure.

Referring to FIG. 13, the client is provided with a plurality of function portals. For example, a portal 1 is a mall portal, a portal 2 is a battle portal, and a portal 3 is another portal. The player 1 may set the customization parameter of the customized skin model of the target virtual character in the skin setting interface, and saves the customization parameter in the server. Next, after the player 1 enters the battle portal, the server matches k players for the player 1 for the same round of MOBA game, and then delivers the customization parameter of the customized skin model of the player to the k players. A client of each player loads and generates a customized skin model according to the customization parameter, and then the customized skin model of the player 1 is finally displayed in in-game presentation.

Apparatus embodiments of the present disclosure are described below. For details that are not described in the apparatus embodiments, refer to the foregoing method embodiments in a one-to-one correspondence with the apparatus embodiments.

Figure 14:
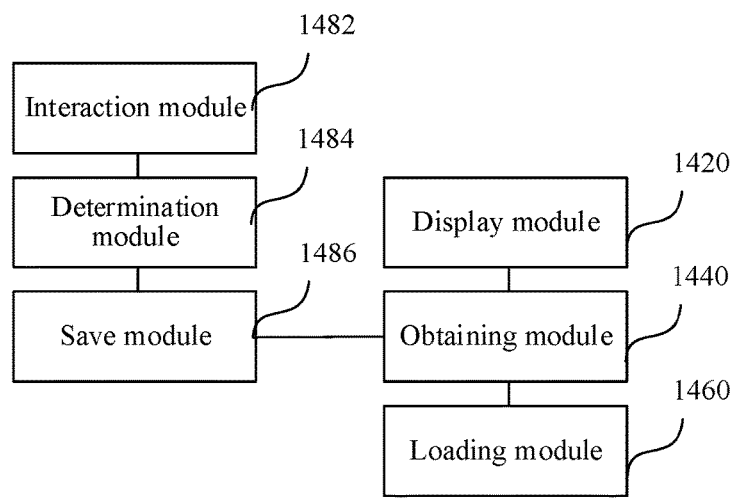
FIG. 14 is a block diagram of an apparatus for displaying a skin of a virtual character according to an exemplary embodiment of the present disclosure.

FIG. 14 is a block diagram of an apparatus for displaying a skin of a virtual character according to an exemplary embodiment of the present disclosure. The apparatus may be implemented as an entire terminal or a part of a terminal by using software, hardware, or a combination thereof. The apparatus includes:

a display module 1420, configured to display a matchmaking UI, the matchmaking UI being used for matching k user accounts online for gaming in the same virtual world, k being a positive integer;

an obtaining module 1440, configured to obtain a customization parameter of a customized skin model of a target virtual character from a server when the target virtual character is present in virtual characters to be used by the k user accounts, the customized skin model being one of complete skin set models corresponding to the target virtual character, the customized skin model including n skin components in the same style, at least one skin component corresponding to a plurality of candidate skin component materials, n being a positive integer;

a loading module 1460, configured to load n target skin component materials of the customized skin model according to the customization parameter, an $i^{th}$ target skin component material being customized in candidate skin component materials corresponding to an $i^{th}$ skin component, i being an integer less than or equal to n; and a display module 1420, configured to display a gaming UI, the gaming UI including the target virtual character located in the virtual world, the target virtual character wearing the customized skin model.

In an optional embodiment, the display module 1420 is configured to display a loading UI, the loading UI being a UI used for prompting that a resource is being loaded, a preview of the customized skin model being displayed on the loading UI. The loading module 1460 is configured to load n target skin component materials of the customized skin model from a local material library according to the customization parameter during the displaying of the loading UI.

In an optional embodiment, the obtaining module 1440 is configured to: obtain a preview of the customized skin model corresponding to a specified parameter from the local material library when the specified parameter is present in the customization parameters; or obtain a preview of the customized skin model from the server, the preview being generated by the server for the customized skin model according to the customization parameter.

In an optional embodiment, at least one specified skin component material in the n target skin component materials has a personalized effect, the personalized effect including at least one of a moving effect, an invisibility effect, an attack effect, a skill-casting effect, a town-portal effect, and an effect of being attacked.

The loading module 1460 is configured to load an effect material of the personalized effect of the specified skin component material according to the customization parameter. The display module 1420 is configured to display the personalized effect in the gaming UI according to the effect material when a status of the target virtual character in the virtual world meets a trigger condition.

In an optional embodiment, referring to FIG. 14, the target virtual character is a virtual character controlled by a current client. The apparatus further includes an interaction module 1482, a determination module 1484, and a save module 1486.

The display module 1420 is configured to display a skin setting interface of the customized skin model, the skin setting interface being an interface for personalizing the customized skin model of the target virtual character. The interaction module 1482 is configured to receive a material selection operation triggered on the skin setting interface. The determination module 1484 is configured to determine the n target skin component materials of the customized skin model according to the material selection operation. The save module 1486 is configured to save the customization parameter corresponding to the n target skin component materials in the server when the n target skin component materials meet a customization condition.

In an optional embodiment, the customization condition includes at least one of the following conditions:

a current user account has the permission to use the target skin component material; a use time of the target skin component material is within a valid period; and styles of the n target skin component materials meet a compatibility condition.

In an optional embodiment, the apparatus further includes:

the interaction module 1482, configured to receive a skin display operation of the customized skin model;

the loading module 1460, configured to load the n target skin component materials of the customized skin model from the server according to the customization parameter of the customized skin model; and the display module 1420, configured to display a skin display interface, the skin display interface being an interface for displaying the customized skin model, the customized skin model including the n target skin component materials.

In the foregoing apparatus for displaying a skin of a virtual character, a suit customized skin model is divided into n skin components, and after matching k virtual characters in a current battle arena game, a client then obtains a customization parameter of a customized skin model of a target virtual character from a server, to load n target skin component materials of the customized skin model, and displays the target virtual character wearing the customized skin model in a gaming UI, so that after the same customized skin model of the same virtual character is divided into n skin components having the same style, each skin component is provided with a plurality of candidate skin component materials. For example, the each skin component is provided with m candidate skin component materials. At most $m^n$ customized skin models may be provided, so that a design cycle of a complete skin set model can be effectively shortened, to provide various personalized skin display effects for users while a design workload is reduced.

Figure 15:
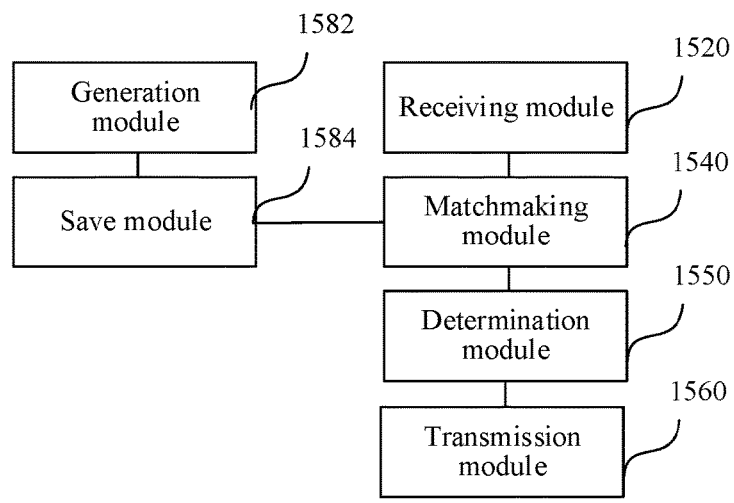
FIG. 15 is a block diagram of an apparatus for displaying a skin of a virtual character according to another exemplary embodiment of the present disclosure.

FIG. 15 is a block diagram of an apparatus for displaying a skin of a virtual character according to an exemplary embodiment of the present disclosure. The apparatus may be implemented as an entire terminal or a part of a terminal by using software, hardware, or a combination thereof. The apparatus includes:

a receiving module 1520, configured to receive a matchmaking request of a client;

a matchmaking module 1540, configured to match k user accounts for gaming in the same virtual world according to the matchmaking request, k being a positive integer;

a determination module 1550, configured to determine k virtual characters to be used by the k user accounts; and a transmission module 1560, configured to transmit a customization parameter of a customized skin model to k clients that respectively correspond to the k virtual characters when a target virtual character having the customized skin model is present in the k virtual characters, the customized skin model being one of complete skin set models corresponding to the target virtual character, the customized skin model including n skin components in the same style, at least one skin component corresponding to a plurality of candidate skin component materials, the customization parameter being used for indicating n target skin component materials of the customized skin model, n being a positive integer.

In an optional embodiment, referring to FIG. 15, the apparatus further includes a generation module 1582.

The generation module 1582 is configured to generate a preview of the customized skin model according to the customization parameter.

The transmission module 1560 is configured to transmit the preview of the customized skin model to the k clients.

In an optional embodiment, referring to FIG. 15, the apparatus further includes a save module 1584.

The receiving module 1520 is configured to receive the customization parameter transmitted by a client corresponding to the target virtual character.

The save module 1584 is configured to save the customization parameter corresponding to the n target skin component materials when the n target skin component materials meet a customization condition.

In an optional embodiment, the customization condition includes at least one of the following conditions:

a current user account has the permission to use the target skin component material; a use time of the target skin component material is within a valid period; and styles of the n target skin component materials meet a compatibility condition.

Each module/unit and/or submodule/subunit in various disclosed embodiments can be integrated in a processing unit, or each module/unit and/or submodule/subunit can exist separately and physically, or two or more modules/units and/or submodule/subunit can be integrated in one unit. The modules/units and/or submodule/subunit as disclosed herein can be implemented in the form of hardware (e.g., processing circuitry and/or memory) or in the form of software functional unit(s) (e.g., developed using one or more computer programming languages), or a combination of hardware and software.

In the foregoing apparatus for displaying a skin of a virtual character, a suit customized skin model is divided into n skin components, and after matching k virtual characters in a current battle arena game, a client then obtains a customization parameter of a customized skin model of a target virtual character from a server, to load n target skin component materials of the customized skin model, and displays the target virtual character wearing the customized skin model in a gaming UI, so that after the same customized skin model of the same virtual character is divided into n skin components having the same style, each skin component is provided with a plurality of candidate skin component materials. For example, the each skin component is provided with m candidate skin component materials. At most $m^n$ customized skin models may be provided, so that a design cycle of a complete skin set model can be effectively shortened, to provide various personalized skin display effects for users while a design workload is reduced.

Figure 16:
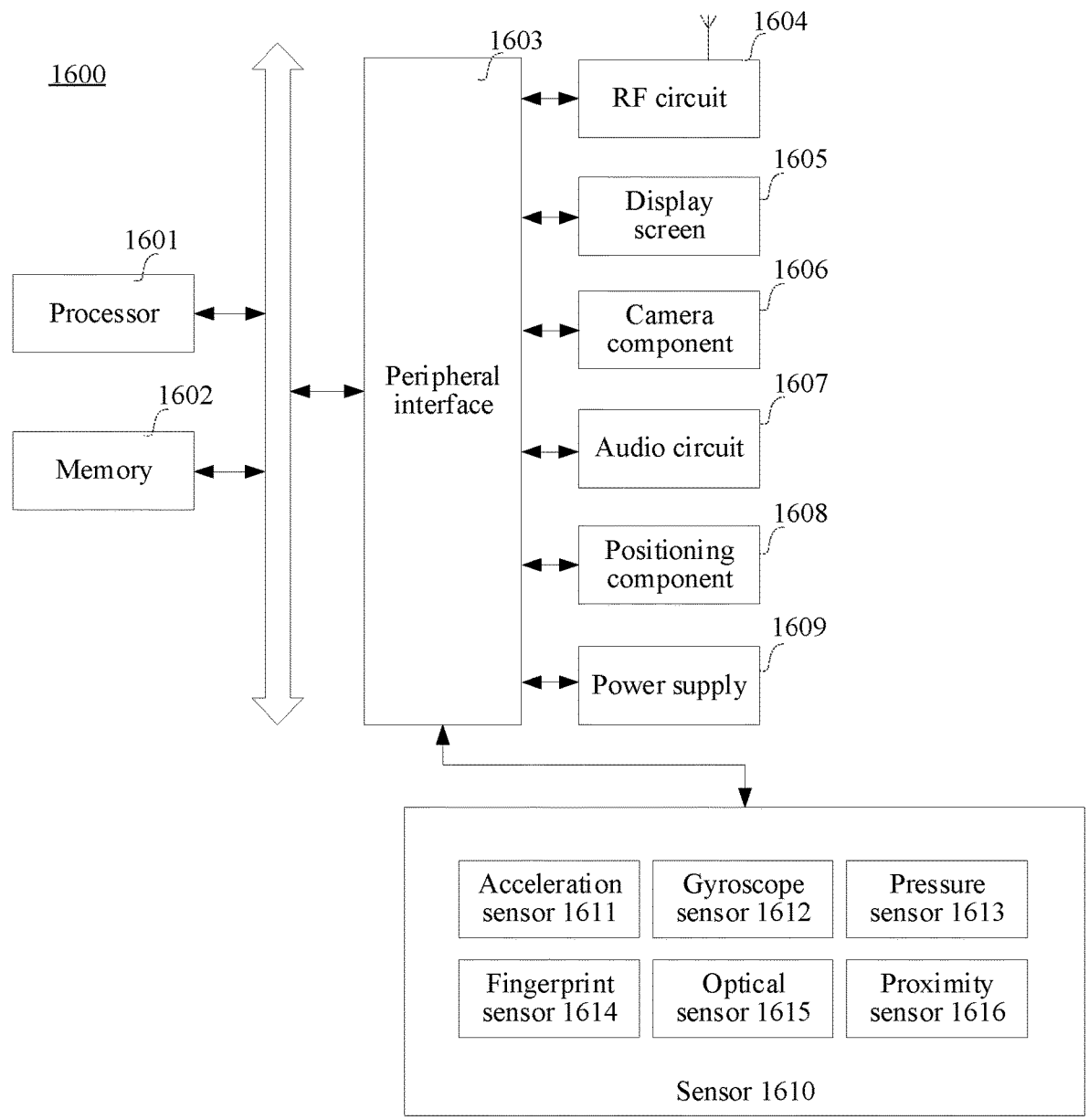
FIG. 16 is a block diagram of a terminal according to an exemplary embodiment of the present disclosure.

FIG. 16 is a structural block diagram of a terminal 1600 according to an exemplary embodiment of the present disclosure. The terminal 1600 may be a smartphone, a tablet computer, a moving picture experts group audio layer III (MP3) player, a moving picture experts group audio layer IV (MP4) player, a notebook computer, or a desktop computer. The terminal 1600 may also be referred to as other names such as user equipment, a portable terminal, a laptop terminal, or a desktop terminal.

Generally, the terminal 1600 includes a processor 1601 and a memory 1602.

The processor 1601 may include one or more processing cores such as a 4-core processor and an 8-core processor. The processor 1601 may be implemented in at least one hardware form of a digital signal processing (DSP), a field-programmable gate array (FPGA), and a programmable logic array (PLA). The processor 1601 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 1601 may be integrated with a graphics processing unit (GPU). The GPU is configured to be responsible for rendering and drawing content to be displayed by a display screen. In some embodiments, the processor 1601 may further include an artificial intelligence (AI) processor. The AI processor is configured to process a calculation operation related to machine learning.

The memory 1602 may include one or more computer-readable storage media that may be non-transitory. The memory 1602 may further include a high-speed random access memory and a non-volatile memory, for example, one or more disk storage devices or flash memory devices. In some embodiments, the non-transient computer-readable storage medium in the memory 1602 is configured to store at least one computer-readable instruction, and the at least one computer-readable instruction is used for being executed by the processor 1601 to implement the method for displaying a skin of a virtual character provided in the method embodiments of the present disclosure.

In some embodiments, the terminal 1600 may alternatively include: a peripheral interface 1603 and at least one peripheral. The processor 1601, the memory 1602, and the peripheral interface 1603 may be connected through a bus or a signal cable. Each peripheral may be connected to the peripheral interface 1603 through a bus, a signal cable, or a circuit board. Specifically, the peripheral includes at least one of a radio frequency (RF) circuit 1604, a touch display screen 1605, a camera 1606, an audio circuit 1607, a positioning component 1608, and a power supply 1609.

The peripheral device interface 1603 may be configured to connect the at least one peripheral related to input/output (I/O) to the processor 1601 and the memory 1602. In some embodiments, the processor 1601, the memory 1602, and the peripheral interface 1603 are integrated on a same chip or circuit board. In some other embodiments, any one or two of the processor 1601, the memory 1602, and the peripheral interface 1603 may be implemented on a separate chip or the circuit board. This is not limited in this embodiment.

The RF circuit 1604 is configured to receive and transmit an RF signal, which is also referred to as an electromagnetic signal. The RF circuit 1604 communicates with a communication network and another communication device by using the electromagnetic signal. The RF circuit 1604 converts an electric signal into an electromagnetic signal for transmission, or converts a received electromagnetic signal into an electric signal. In one embodiment, the RF circuit 1604 includes: an antenna system, an RF transceiver, one or more amplifiers, a tuner, an oscillator, a digital signal processor, a codec chip set, a subscriber identity module card, and the like. The RF circuit 1604 may communicate with other terminals through at least one wireless communication protocol. The wireless communication protocol includes, but is not limited to, a world wide web, a metropolitan area network, an intranet, generations of mobile communication networks (2G, 3G, 4G, and 5G), a wireless local area network and/or a Wireless Fidelity (Wi-Fi) network. In some embodiments, the RF circuit 1604 may further include a circuit related to a near field communication (NFC). This is not limited in the present disclosure.

The display screen 1605 is configured to display a UI. The UI may include a graph, text, an icon, a video, and any combination thereof. When the display screen 1605 is a touch display screen, the display screen 1605 also has the capability to collect a touch signal on or above a surface of the display screen 1605. The touch signal may be used as a control signal to be inputted into the processor 1601 for processing. In this case, the display screen 1605 may further be configured to provide a virtual button and/or a virtual keyboard that are/is also referred to as a soft button and/or a soft keyboard. In some embodiments, there may be one display screen 1605 disposed on a front panel of the terminal 1600. In some other embodiments, there may be at least two display screens 1605 respectively disposed on different surfaces of the terminal 1600 or designed in a foldable shape. In still some other embodiments, the display screen 1605 may be a flexible display screen disposed on a curved surface or a folded surface of the terminal 1600. Even, the display screen 1605 may further be configured to have a non-rectangular irregular graph, that is, a special-shaped screen. The display screen 1605 may be manufactured by using a material such as a liquid crystal display (LCD) or an organic light-emitting diode (OLED).

The camera component 1606 is configured to capture an image or a video. In one embodiment, the camera component 1606 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and wide-angle camera, or another fusion shooting function. In some embodiments, the camera component 1606 may further include a flashlight. The flashlight may be a single-color-temperature flashlight or a dual-color-temperature flashlight. The dual-color-temperature flashlight is a combination of a warm flashlight and a cold flashlight, which may be used for light compensation at different color temperatures.

The audio circuit 1607 may include a microphone and a loudspeaker. The microphone is configured to collect sound waves of a user and an environment, and convert the sound waves into electrical signals and input the electrical signals into the processor 1601 for processing, or input the electrical signals into the RF circuit 1604 to implement speech communication. For a purpose of stereo collection or noise reduction, there may be a plurality of microphones disposed at different portions of the terminal 1600 respectively. The microphone may further be an array microphone or an omni-directional collection type microphone. The loudspeaker is configured to convert electrical signals from the processor 1601 or the RF circuit 1604 into sound waves. The loudspeaker may be a conventional thin-film loudspeaker or a piezoelectric ceramic loudspeaker. When the loudspeaker is the piezoelectric ceramic loudspeaker, electrical signals not only may be converted into sound waves that can be heard by human, but also may be converted into sound waves that cannot be heard by human for ranging and the like. In some embodiments, the audio circuit 1607 may further include an earphone jack.

The positioning component 1608 is configured to position a current geographic location of the terminal 1600 for implementing navigation or a location-based service (LBS). The positioning component 1608 may be a positioning component based on the global positioning system (GPS) of the United States, the BeiDou system of China, or the Galileo system of Russia.

The power supply 1609 is configured to supply power to components in the terminal 1600. The power supply 1609 may be an alternating current, a direct current, a primary battery, or a rechargeable battery. When the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may further be configured to support a quick charge technology.

In some embodiments, the terminal 1600 further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

The acceleration sensor 1611 may detect a magnitude of acceleration on three coordinate axes of a coordinate system established with the terminal 1600. For example, the acceleration sensor 1611 may be configured to detect a component of gravity acceleration on the three coordinate axes. The processor 1601 may control, according to a gravity acceleration signal collected by the acceleration sensor 1611, the touch display screen 1605 to display the UI in a frame view or a portrait view. The acceleration sensor 1611 may further be configured to collect motion data of a game or a user.

The gyroscope sensor 1612 may detect a body direction and a rotation angle of the terminal 1600. The gyroscope sensor 1612 may cooperate with the acceleration sensor 1611 to collect a 3D action by the user on the terminal 1600. The processor 1601 may implement the following functions according to data collected by the gyroscope sensor 1612: motion sensing (for example, the UI is changed according to a tilt operation of the user), image stabilization during shooting, game control, and inertial navigation.

The pressure sensor 1613 may be disposed on a side frame of the terminal 1600 and/or a lower layer of the touch display screen 1605. When the pressure sensor 1613 is disposed on the side frame of the terminal 1600, a holding signal of the user on the terminal 1600 may be detected. The processor 1601 performs left and right hand recognition or a quick operation according to the holding signal collected by the pressure sensor 1613. When the pressure sensor 1613 is disposed on the low layer of the touch display screen 1605, the processor 1601 controls, according to a pressure operation of the user on the touch display screen 1605, an operable control on the UI. The operable control includes at least one of a button control, a scroll bar control, an icon control, and a menu control.

The fingerprint sensor 1614 is configured to collect a fingerprint of a user, and the processor 1601 recognizes an identity of the user according to the fingerprint collected by the fingerprint sensor 1614, or the fingerprint sensor 1614 recognizes the identity of the user according to the collected fingerprint. When the identity of the user is recognized as credible, the processor 1601 authorizes the user to perform a related sensitive operation. The sensitive operation includes screen unlocking, viewing of encrypted information, software downloading, payment, setting changing, or the like. The fingerprint sensor 1614 may be disposed on a front surface, a back surface, or a side surface of the terminal 1600. When a physical button or a vendor logo is disposed on the terminal 1600, the fingerprint 1614 may be integrated with the physical button or the vendor logo.

The optical sensor 1615 is configured to collect ambient light intensity. In an embodiment, the processor 1601 may control display brightness of the touch display 1605 according to the ambient light intensity collected by the optical sensor 1615. Specifically, when the ambient light intensity is relatively high, the display luminance of the touch display screen 1605 is increased. When the ambient light intensity is relatively low, the display luminance of the touch display screen 1605 is reduced. In another embodiment, the processor 1601 may further dynamically adjust a photographing parameter of the camera assembly 1606 according to the ambient light intensity collected by the optical sensor 1615.

The proximity sensor 1616, also referred to as a distance sensor, is usually disposed on the front panel of the terminal 1600. The proximity sensor 1616 is configured to collect a distance between the user and the front surface of the terminal 1600. In an embodiment, when the proximity sensor 1616 detects that the distance between the user and the front surface of the terminal 1600 gradually becomes smaller, the touch display screen 1605 is controlled by the processor 1601 to switch from a screen-on state to a screen-off state. When the proximity sensor 1616 detects that the distance between the user and the front surface of the terminal 1600 gradually becomes larger, the touch display screen 1605 is controlled by the processor 1601 to switch from the screen-off state to the screen-on state.

A person skilled in the art may understand that a structure shown in FIG. 16 constitutes no limitation on the terminal 1600, and the terminal may include more or fewer components than those shown in the figure, or combine some components, or use a different component deployment.

The present disclosure further provides a server, the server includes a processor and a memory, the memory stores computer-readable instructions, and the computer-readable instructions are loaded and executed by the processor to implement the method for displaying a skin of a virtual character provided in the foregoing method embodiments. The server may be a server provided in FIG. 17 below.

Figure 17:
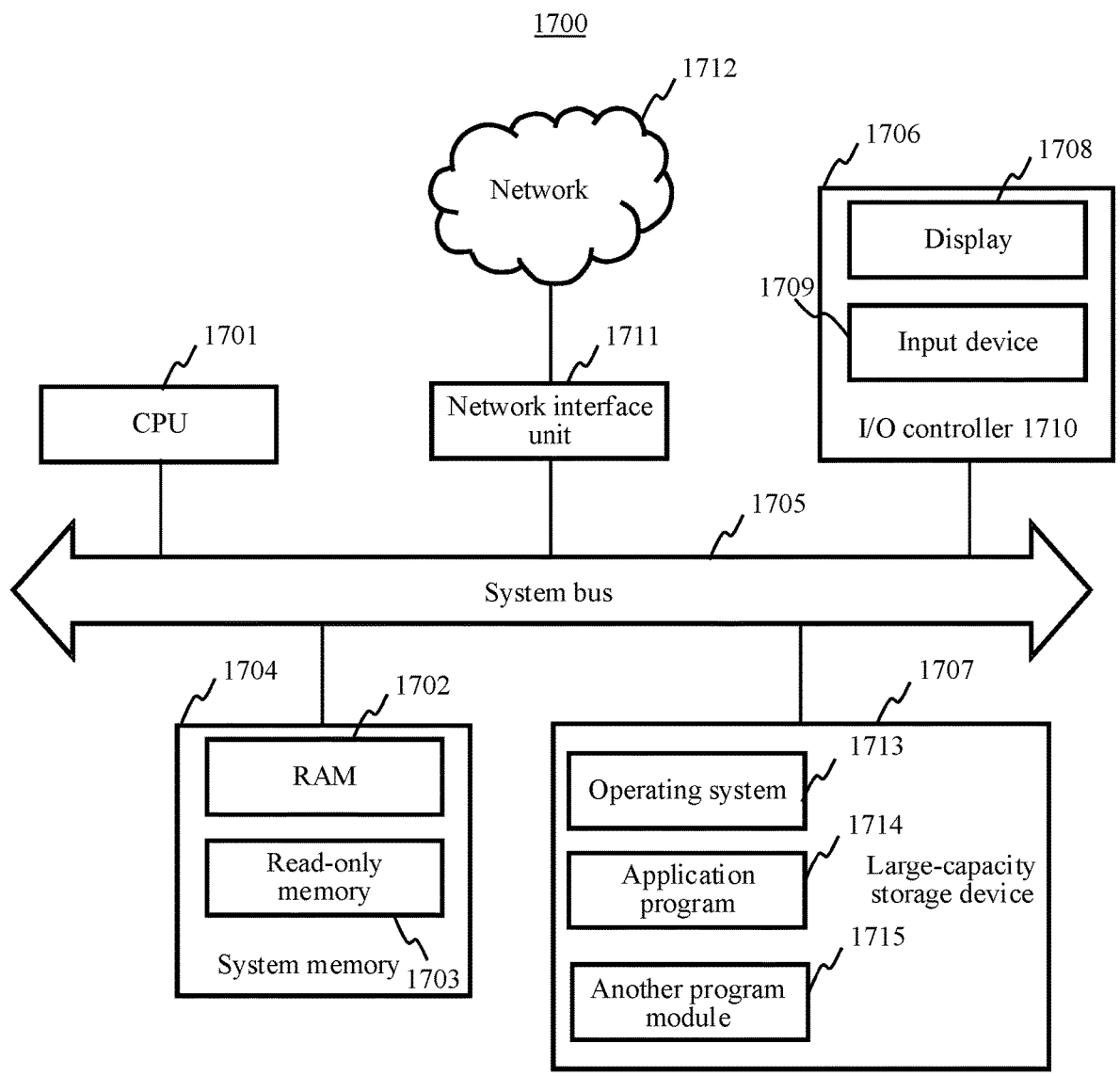
FIG. 17 is a block diagram of a server according to an exemplary embodiment of the present disclosure.

FIG. 17 is a schematic structural diagram of a server according to an exemplary embodiment of the present disclosure. Specifically, the server 1700 includes a CPU 1701, a system memory 1704 including a random access memory (RAM) 1702 and a read-only memory (ROM) 1703, and a system bus 1705 connecting the system memory 1704 and the CPU 1701. The server 1700 further includes a basic I/O system 1706 for transmitting information between components in a computer, and a large-capacity storage device 1707 configured to store an operating system 1713, a client 1714, and another program module 1715.

The basic I/O system 1706 includes a display 1708 configured to display information, and an input device 1709 such as a mouse or a keyboard used by a user to input information. The display 1708 and the input device 1709 are both connected to the CPU 1701 by using an I/O controller 1710 connected to the system bus 1705. The basic I/O system 1706 may further include the I/O controller 1710, to receive and process inputs from a plurality of other devices such as a keyboard, a mouse, and an electronic stylus. Similarly, the I/O controller 1710 further provides an output to a display, a printer or another type of output device.

The large-capacity storage device 1707 is connected to the CPU 1701 by using a large-capacity storage controller (not shown) connected to the system bus 1705. The large-capacity storage device 1707 and an associated computer readable medium provide non-volatile storage for the server 1700. That is, the large-capacity storage device 1707 may include a computer-readable medium (not shown), such as a hard disk or a CD-ROM drive.

Without loss of generality, the computer readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an EPROM, an EEPROM, a flash memory or another solid-state storage technology, a CD-ROM, a DVD or another optical storage, a magnetic cassette, a magnetic tape, or a magnetic disk storage or another magnetic storage device. Certainly, it may be known by a person skilled in the art that the computer storage medium is not limited to, the foregoing several types. The system memory 1704 and the large-capacity storage device 1707 may be generally referred to as a memory.

The memory stores one or more computer-readable instructions. The one or more computer-readable instructions are configured to be implemented by one or more CPUs 1701. The one or more computer-readable instructions are used for implementing the foregoing method for displaying a skin of a virtual character. The CPU 1701 executes the one or more computer-readable instructions to implement the method for displaying a skin of a virtual character provided in the foregoing method embodiments.

According to the embodiments of the present disclosure, the server 1700 may further be connected, by using a network such as the Internet, to a remote computer on the network and run That is, the server 1700 may be connected to a network 1712 by using a network interface unit 1711 connected to the system bus 1705, or may be connected to another type of network or a remote computer system (not shown) by using a network interface unit 1711.

The memory further includes one or more computer-readable instructions. The one or more computer-readable instructions are stored in the memory. The one or more computer-readable instructions are used for performing the steps, performed by the server, in the method for displaying a skin of a virtual character provided in the embodiments of the present disclosure.

An embodiment of the present disclosure further provides a computer-readable storage medium. The storage medium stores at least one computer-readable instruction, at least one program, a code set, or a computer-readable instruction set. The at least one computer-readable instruction, the at least one program, the code set, or the computer-readable instruction set is loaded and executed by the processor to implement the method for displaying a skin of a virtual character described in any one of FIG. 2 to FIG. 10.

The present disclosure further provides a computer program product, the computer program product, when run on a computer device, causing the computer device to perform the method for displaying a skin of a virtual character provided in the foregoing method embodiments.

The sequence numbers of the foregoing embodiments of the present disclosure are merely for description purpose, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be a ROM, a magnetic disk, an optical disc, or the like.

The foregoing description is merely exemplary embodiments of the present disclosure, but is not intended to limit the present disclosure. Any modification, equivalent replacement, or improvement made within the spirit and principle of the present disclosure shall fall within the protection scope of the present disclosure.

What is claimed is:

1. A method for displaying a skin of a virtual character, performed by a terminal, the method comprising:
   displaying a skin setting interface for configuring a customized skin model of a target virtual character, wherein the customized skin model is a complete skin set model having n skin components, n being a positive integer, and at least one skin component of the customized skin model corresponds to a plurality of candidate skin component materials;
   determining n target skin component materials of the customized skin model in response to a material selection operation triggered on the skin setting interface;
   saving a customization parameter corresponding to the n target skin component materials in a server when the n target skin component materials meet a customization condition;
   displaying a matchmaking user interface (UI) for matching k user accounts online for gaming in a virtual world, k being a positive integer;
   obtaining the customization parameter of the customized skin model of the target virtual character from the server when the target virtual character is present in virtual characters used by the k user accounts;
   loading the n target skin component materials of the customized skin model according to the customization parameter; and
   displaying a gaming UI, the gaming UI comprising the target virtual character located in the virtual world, the target virtual character wearing the customized skin model.

2. The method according to claim 1, wherein the loading n target skin component materials of the customized skin model according to the customization parameter comprises:
   displaying a loading UI for prompting that a resource is being loaded, a preview of the customized skin model being displayed on the loading UI; and
   loading the n target skin component materials of the customized skin model from a local material library according to the customization parameter during the displaying of the loading UI.

3. The method according to claim 2, wherein the method further comprises:
   obtaining the preview of the customized skin model corresponding to a specified parameter from the local material library when the specified parameter is present in the customization parameters;
   or
   obtaining the preview of the customized skin model from the server, the preview being generated by the server for the customized skin model according to the customization parameter.

4. The method according to claim 2, wherein the n target skin component materials includes at least one specified skin component having a personalized effect, the personalized effect comprising at least one of a moving effect, an invisibility effect, an attack effect, a skill-casting effect, a town-portal effect, and an effect of being attacked; and
   the method further comprises:
   loading an effect material of the personalized effect of the specified skin component material according to the customization parameter; and
   displaying the personalized effect in the gaming UI according to the effect material when a status of the target virtual character in the virtual world meets a trigger condition.

5. The method according to claim 1, wherein the customization condition comprises at least one of the following conditions:
- a current user account has the permission to use the target skin component material;
- a use time of the target skin component material is within a valid period; and
- styles of the n target skin component materials meet a compatibility condition.

6. The method according to claim 1, wherein the method further comprises:
- receiving a skin display operation of the customized skin model;
- loading the n target skin component materials of the customized skin model from the server according to the customization parameter of the customized skin model; and
- displaying a skin display interface for presenting the customized skin model, the customized skin model comprising the n target skin component materials.

7. A terminal, comprising a memory and one or more processors, the memory storing computer-readable instructions, the computer-readable instructions, when executed by the one or more processors, causing the one or more processors to perform a plurality of operations comprising:
- displaying a skin setting interface for configuring a customized skin model of a target virtual character, wherein the customized skin model is a complete skin set model having n skin components, n being a positive integer, and at least one skin component of the customized skin model corresponds to a plurality of candidate skin component materials;
- determining n target skin component materials of the customized skin model in response to a material selection operation triggered on the skin setting interface;
- saving a customization parameter corresponding to the n target skin component materials in a server when the n target skin component materials meet a customization condition;
- displaying a matchmaking user interface (UI) for matching k user accounts online for gaming in a virtual world, k being a positive integer;
- obtaining the customization parameter of the customized skin model of the target virtual character from the server when the target virtual character is present in virtual characters used by the k user accounts;
- loading the n target skin component materials of the customized skin model according to the customization parameter; and
- displaying a gaming UI, the gaming UI comprising the target virtual character located in the virtual world, the target virtual character wearing the customized skin model.

8. The terminal according to claim 7, wherein the loading n target skin component materials of the customized skin model according to the customization parameter comprises:
- displaying a loading UI for prompting that a resource is being loaded, a preview of the customized skin model being displayed on the loading UI; and
- loading the n target skin component materials of the customized skin model from a local material library according to the customization parameter during the displaying of the loading UI.

9. The terminal according to claim 8, wherein the plurality of operations further comprises:
- obtaining the preview of the customized skin model corresponding to a specified parameter from the local material library when the specified parameter is present in the customization parameters.

10. The terminal according to claim 8, wherein the plurality of operations further comprises:
- obtaining the preview of the customized skin model from the server, the preview being generated by the server for the customized skin model according to the customization parameter.

11. The terminal according to claim 8, wherein the n target skin component materials includes at least one specified skin component having a personalized effect, the personalized effect comprising at least one of a moving effect, an invisibility effect, an attack effect, a skill-casting effect, a town-portal effect, and an effect of being attacked; and
the plurality of operations further comprises:
- loading an effect material of the personalized effect of the specified skin component material according to the customization parameter; and
- displaying the personalized effect in the gaming UI according to the effect material when a status of the target virtual character in the virtual world meets a trigger condition.

12. The terminal according to claim 7, wherein the customization condition comprises at least one of the following conditions:
- a current user account has the permission to use the target skin component material;
- a use time of the target skin component material is within a valid period; and
- styles of the n target skin component materials meet a compatibility condition.

13. The terminal according to claim 7, wherein the plurality of operations further comprises:
- receiving a skin display operation of the customized skin model;
- loading the n target skin component materials of the customized skin model from the server according to the customization parameter of the customized skin model; and
- displaying a skin display interface for presenting the customized skin model, the customized skin model comprising the n target skin component materials.

14. One or more non-transitory computer-readable storage media storing computer-readable instructions, the computer-readable instructions, when executed by one or more processors, causing the one or more processors to perform a plurality of operations comprising:
- displaying a skin setting interface for configuring a customized skin model of a target virtual character, wherein the customized skin model is a complete skin set model having n skin components, n being a positive integer, and at least one skin component of the customized skin model corresponds to a plurality of candidate skin component materials;
- determining n target skin component materials of the customized skin model in response to a material selection operation triggered on the skin setting interface;
- saving a customization parameter corresponding to the n target skin component materials in a server when the n target skin component materials meet a customization condition;
- displaying a matchmaking user interface (UI) for matching k user accounts online for gaming in a virtual world, k being a positive integer;
- obtaining the customization parameter of the customized skin model of the target virtual character from the server when the target virtual character is present in virtual characters used by the k user accounts;

loading the n target skin component materials of the customized skin model according to the customization parameter; and displaying a gaming UI, the gaming UI comprising the target virtual character located in the virtual world, the target virtual character wearing the customized skin model.

15. The storage media according to claim 14, wherein the loading n target skin component materials of the customized skin model according to the customization parameter comprises:

displaying a loading UI for prompting that a resource is being loaded, a preview of the customized skin model being displayed on the loading UI; and loading the n target skin component materials of the customized skin model from a local material library according to the customization parameter during the displaying of the loading UI.

16. The storage media according to claim 15, wherein the plurality of operations further comprises:

obtaining the preview of the customized skin model corresponding to a specified parameter from the local material library when the specified parameter is present in the customization parameters.

17. The storage media according to claim 15, wherein the plurality of operations further comprises:

obtaining the preview of the customized skin model from the server, the preview being generated by the server for the customized skin model according to the customization parameter.

18. The storage media according to claim 15, wherein the n target skin component materials includes at least one specified skin component having a personalized effect, the personalized effect comprising at least one of a moving effect, an invisibility effect, an attack effect, a skill-casting effect, a town-portal effect, and an effect of being attacked; and the plurality of operations further comprises:

loading an effect material of the personalized effect of the specified skin component material according to the customization parameter; and displaying the personalized effect in the gaming UI according to the effect material when a status of the target virtual character in the virtual world meets a trigger condition.

19. The storage media according to claim 15, wherein the customization condition comprises at least one of the following conditions:

a current user account has the permission to use the target skin component material;

a use time of the target skin component material is within a valid period; and styles of the n target skin component materials meet a compatibility condition.

20. The storage media according to claim 15, wherein the plurality of operations further comprises:

receiving a skin display operation of the customized skin model;

loading the n target skin component materials of the customized skin model from the server according to the customization parameter of the customized skin model; and displaying a skin display interface for presenting the customized skin model, the customized skin model comprising the n target skin component materials.

* * * * *